(12) United States Patent
    Sugita

(10) Patent No.: US 9,638,904 B2
(45) Date of Patent: May 2, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 14/667,781

(22) Filed: Mar. 25, 2015

(65) Prior Publication Data
    US 2015/0277091 A1    Oct. 1, 2015

(30) Foreign Application Priority Data
    Apr. 1, 2014    (JP) .................... 2014-075362

(51) Int. Cl.
    *G02B 15/177*    (2006.01)
    *G02B 13/04*     (2006.01)
    *G02B 7/10*      (2006.01)

(52) U.S. Cl.
    CPC ............ *G02B 15/177* (2013.01); *G02B 7/10* (2013.01); *G02B 13/04* (2013.01)

(58) Field of Classification Search
    CPC ...... G02B 15/14; G02B 15/16; G02B 15/177; G02B 15/20; G02B 13/04; G02B 27/0018; G02B 27/0025; G02B 27/646
    See application file for complete search history.

(56) References Cited

U.S. PATENT DOCUMENTS

| 5,701,204 A | 12/1997 | Matsumoto |
| 2011/0109978 A1* | 5/2011 | Yamada ................. G02B 15/17 359/684 |

(Continued)

FOREIGN PATENT DOCUMENTS

| CN | 1384383 A | 12/2002 |
| CN | 1771452 A | 5/2006 |

(Continued)

OTHER PUBLICATIONS

European Search Report issued in corresponding Application No. 15000907.4 dated Aug. 14, 2015.

(Continued)

*Primary Examiner* — Bumsuk Won
*Assistant Examiner* — Ephrem Mebrahtu
(74) *Attorney, Agent, or Firm* — Carter, DeLuca, Farrell & Schmidt, LLP

(57) ABSTRACT

In a zoom lens including, in order from an object side: a front group including at least one lens unit; a positive lens unit; and a negative lens unit, an interval between the lens units adjacent to each other is changed during zooming, a combined focal length of the front group is negative at a wide angle end, the positive lens unit moves toward the object side during zooming from the wide angle end to a telephoto end, the negative lens unit moves toward the image side during focusing from infinity to proximity at a first zoom position, and during focusing from infinity to proximity at a second zoom position, which is on a telephoto side of the first zoom position, the positive lens unit moves toward the image side, and the negative lens unit moves toward the object side.

14 Claims, 13 Drawing Sheets

(56) References Cited

U.S. PATENT DOCUMENTS

| | | | | |
|---|---|---|---|---|
| 2012/0327276 A1* | 12/2012 | Ono | ............... | G02B 13/0065 |
| | | | | 348/240.3 |
| 2013/0286257 A1* | 10/2013 | Tashiro | ............. | G02B 15/14 |
| | | | | 359/683 |
| 2014/0132790 A1* | 5/2014 | Takahashi | .......... | G02B 15/177 |
| | | | | 359/680 |

FOREIGN PATENT DOCUMENTS

| JP | 2007-093974 A | 4/2007 |
|---|---|---|
| JP | 2012-083726 A | 4/2012 |
| JP | 2014021257 A | 2/2014 |

OTHER PUBLICATIONS

Chinese Office Action issued in corresponding application No. 201510146148.0 on Nov. 7, 2016.

* cited by examiner

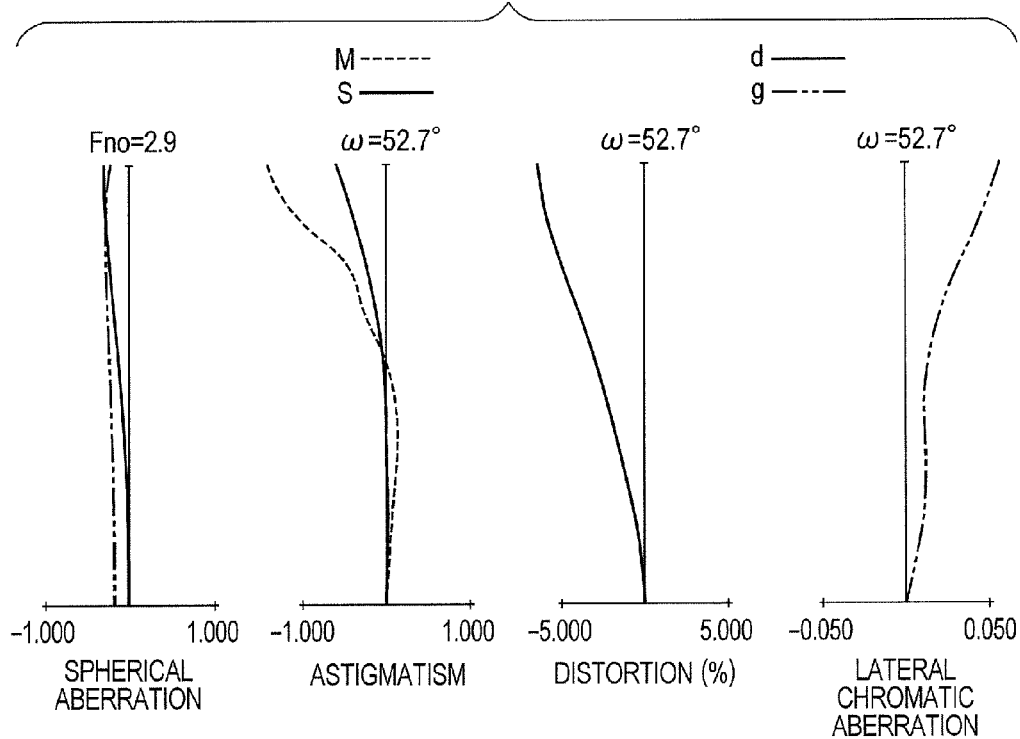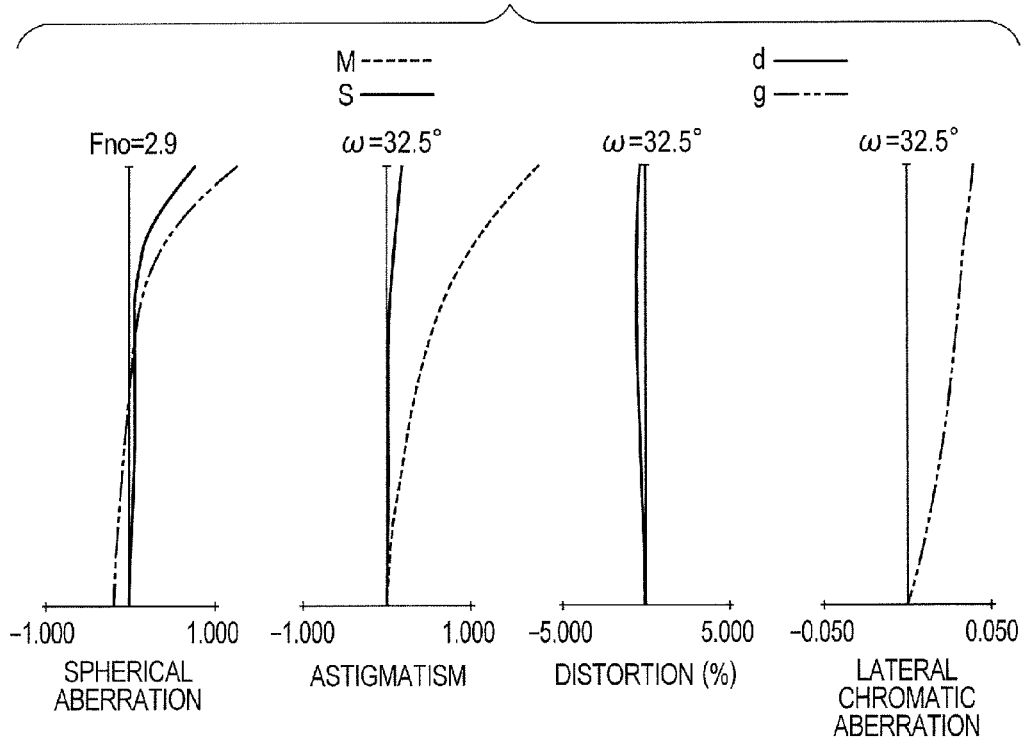

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for, for example, an image pickup optical system used in an image pickup apparatus such as a digital still camera, a digital video camera, a television (TV) camera, a monitoring camera, or the like.

Description of the Related Art

It is demanded that an image pickup optical system used in an image pickup apparatus be a zoom lens having a wide angle of field and high optical performance over an entire object distance from an object at infinity to an object at short distance. Hitherto, in order to obtain the high optical performance over the entire object distance with a small aberration variation during focusing, there have been known zoom lenses in which at least two lens units are configured to move during the focusing.

Of those zoom lenses, there has been known a zoom lens in which movement directions of the lens units, which move during the focusing, are changed depending on a zoom area to obtain high optical performance over the entire object distance.

In Japanese Patent Application Laid-Open No. 2012-83726, there is disclosed, in Embodiment 1, a six-unit zoom lens consisting of, in order from an object side to an image side, first to sixth lens units respectively having positive, negative, positive, positive, positive, and positive refractive powers, in which the second, fourth, and fifth lens units move during zooming. During focusing from an object at infinity to an object at short distance, the second lens unit moves toward the image side at a wide angle end, and moves toward the object side at an intermediate zoom position to a telephoto end. In addition, the fourth lens unit moves toward the object side at the wide angle end and the intermediate zoom position, and moves toward the image side at the telephoto end. Further, the fifth lens unit moves toward the object side over an entire zoom range.

In Japanese Patent Application Laid-Open No. 2007-93974, there is disclosed, in Embodiment 2, a four-unit zoom lens consisting of, in order from an object side to an image side, first to fourth lens units respectively having positive, negative, positive, and positive refractive powers, in which the lens units are moved during zooming. During focusing from an object at infinity to an object at short distance, the second lens unit moves toward the object side from an intermediate zoom position to the telephoto end. The third lens unit moves toward the image side at a wide angle end, and moves toward the object side at the intermediate zoom position. The fourth lens unit moves toward the image side at the wide angle end.

In recent years, it is demanded that a zoom lens used in an image pickup apparatus be able to focus at high speed, and have high optical performance over an entire object distance from an object at infinity to an object at short distance. In order to obtain such zoom lens, it is important to appropriately configure a zoom type, the number of lens units for focusing and their movement conditions, and the like. Of focus types, a focus type in which the lens units for focusing are moved in different directions in a predetermined zoom area of all zoom areas is small in aberration variation, with the result that the high optical performance becomes easy to obtain over all zoom areas and the entire object distance.

In order to obtain the high optical performance over all zoom areas and the entire object distance, selection of the plurality of lens units, which are moved during focusing, of the plurality of lens units forming the zoom lens, and appropriate setting of the movement conditions in each zoom area and the like become important. When those configurations are not appropriately set, the high optical performance becomes difficult to obtain over all zoom areas and the entire object distance while reducing the aberration variation. In addition, it becomes difficult to carry out focusing at high speed.

SUMMARY OF THE INVENTION

According to one embodiment of the present invention, there is provided a zoom lens including, in order from an object side to an image side:
a front lens group including at least one lens unit;
a positive lens unit (Lp) having a positive refractive power; and
a negative lens unit (Ln) having a negative refractive power,
in which an interval between the lens units adjacent to each other is changed during zooming,
in which a combined focal length of the front lens group is negative at a wide angle end,
in which the positive lens unit (Lp) moves toward the object side during zooming from the wide angle end to a telephoto end,
in which the negative lens unit (Ln) moves toward the image side during focusing from an object at infinity to an object at short distance at a first zoom position, and
in which during focusing from an object at infinity to an object at short distance at a second zoom position, which is on a telephoto side of the first zoom position, the positive lens unit (Lp) moves toward the image side, and the negative lens unit (Ln) moves toward the object side.

Further features of the present invention will become apparent from the following description of exemplary embodiments with reference to the attached drawings.

BRIEF DESCRIPTION OF THE DRAWINGS

FIGS. 3A and 3B are aberration diagrams (at object distance: 0.28 m) at the wide angle end and the telephoto end, respectively, of the zoom lens according to Numerical Embodiment 1 of the present invention.

DESCRIPTION OF THE EMBODIMENTS

Now, a zoom lens according to embodiments of the present invention and an image pickup apparatus including the same are described. The zoom lens according to the present invention includes, in order from an object side to an image side, a front lens group including at least one lens unit, a lens unit Lp having a positive refractive power, and a lens unit Ln having a negative refractive power, and an interval between each two adjacent lens units is changed during zooming. The term "front lens group" as used herein refers to all lens units positioned on the object side of the lens unit Lp. A combined focal length of the front lens group is negative at a wide angle end, and the lens unit Lp moves toward the object side during zooming from the wide angle end to a telephoto end.

At this time, the lens unit Ln moves toward the image side during focusing from an object at infinity to an object at short distance at a first zoom position. During focusing from the object at infinity to the object at short distance at a second zoom position on a telephoto side of the first zoom position, the lens unit Lp moves toward the image side, and the lens unit Ln moves toward the object side.

The term "lens unit" as used herein in the context of the zoom lens according to the present invention refers to the unit from a frontmost surface of an optical system or a surface having an interval with a preceding lens that changes during zooming or focusing to a rearmost surface of the optical system or a surface having an interval with a posterior lens that changes during zooming or focusing.

Figure 1:
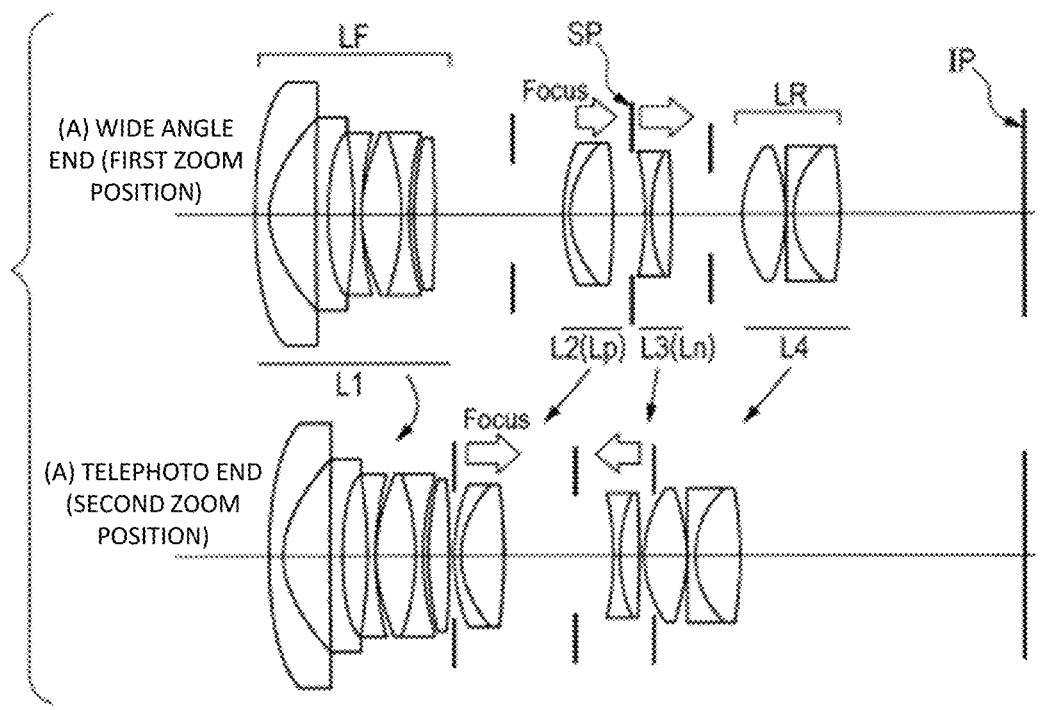
FIG. 1 is a lens cross-sectional view at a wide angle end and a telephoto end, respectively, of a zoom lens according to Embodiment 1 of the present invention.
Figure 2A:
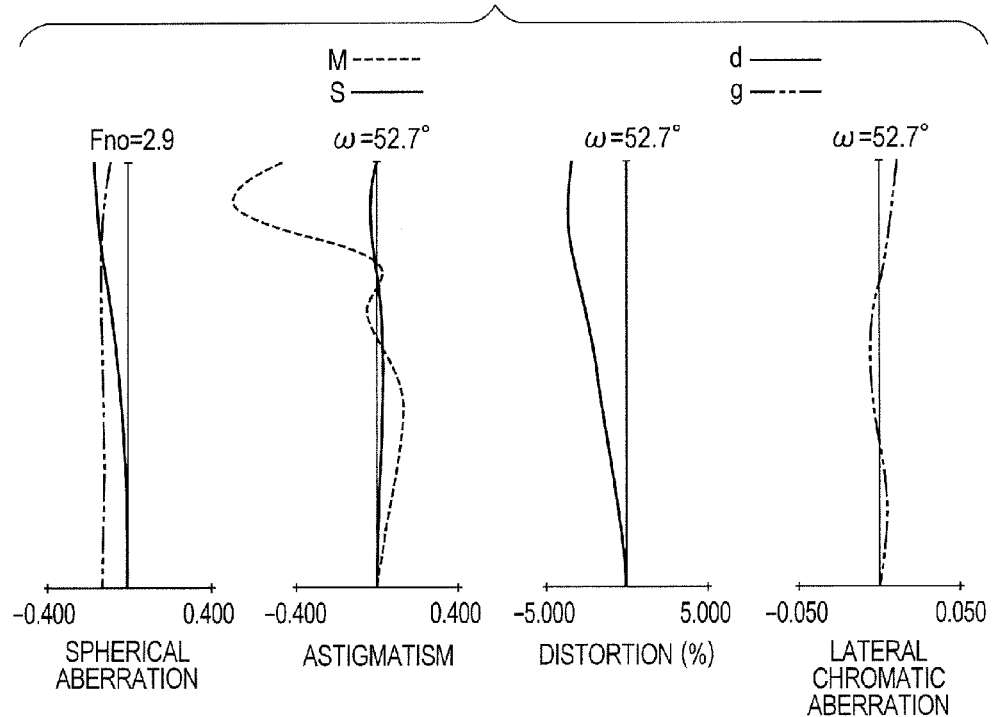
FIGS. 2A and 2B are aberration diagrams (at object of infinity) at the wide angle end and the telephoto end, respectively, of a zoom lens according to Numerical Embodiment 1 of the present invention.
Figure 2B:
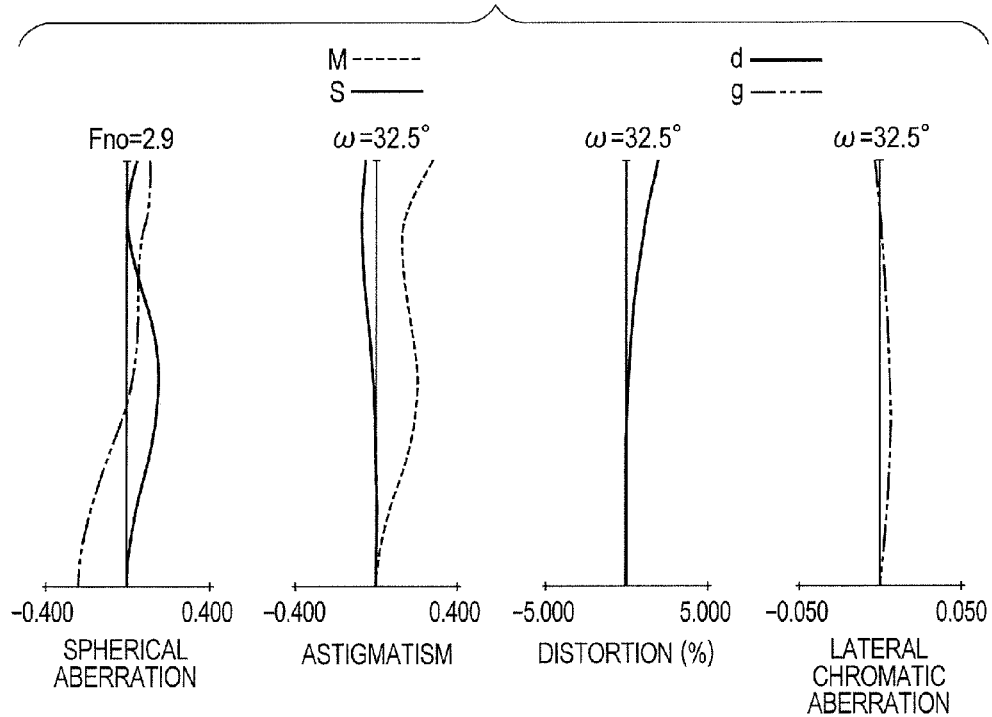

FIG. 1 is a lens cross-sectional view at the wide angle end and the telephoto end, respectively, according to Embodiment 1 of the present invention. FIGS. 2A and 2B are aberration diagrams at the wide angle end and the telephoto end, respectively, of a zoom lens according to Embodiment 1 of the present invention when the zoom lens is focused on the object of infinity. FIGS. 3A and 3B are aberration diagrams at the wide angle end and the telephoto end, respectively, of the zoom lens according to Embodiment 1 of the present invention at an object distance of 0.28 m when, in numerical embodiments which are described later, each size is expressed in units of mm. The term "object distance" as used herein refers to a distance from an image plane.

Figure 4:
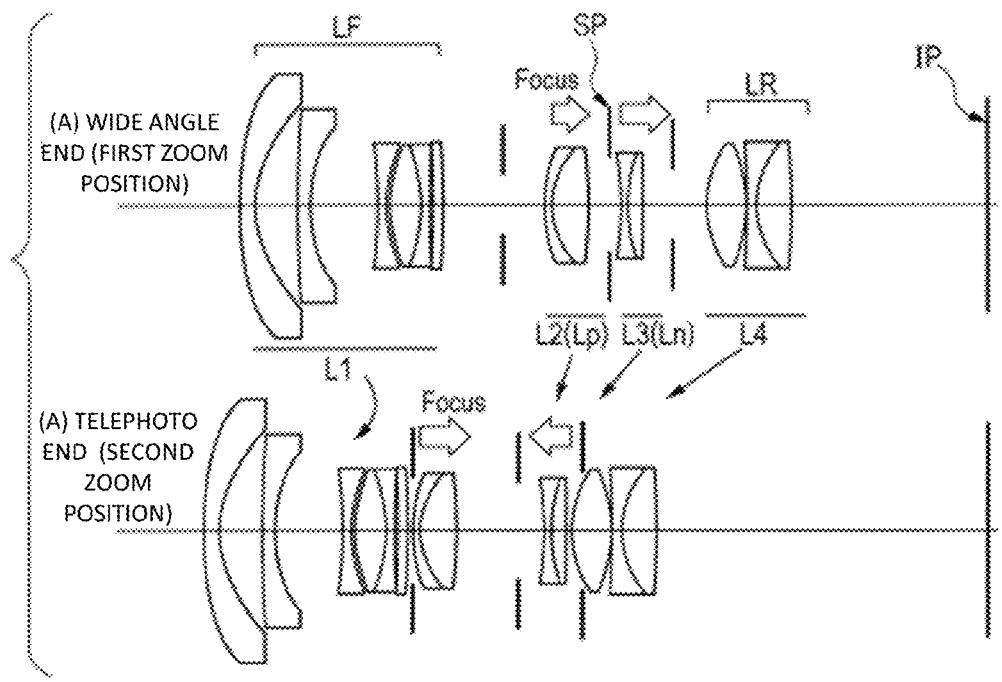
FIG. 4 is a lens cross-sectional view at a wide angle end and a telephoto end, respectively, of a zoom lens according to Embodiment 2 of the present invention.
Figure 5A:
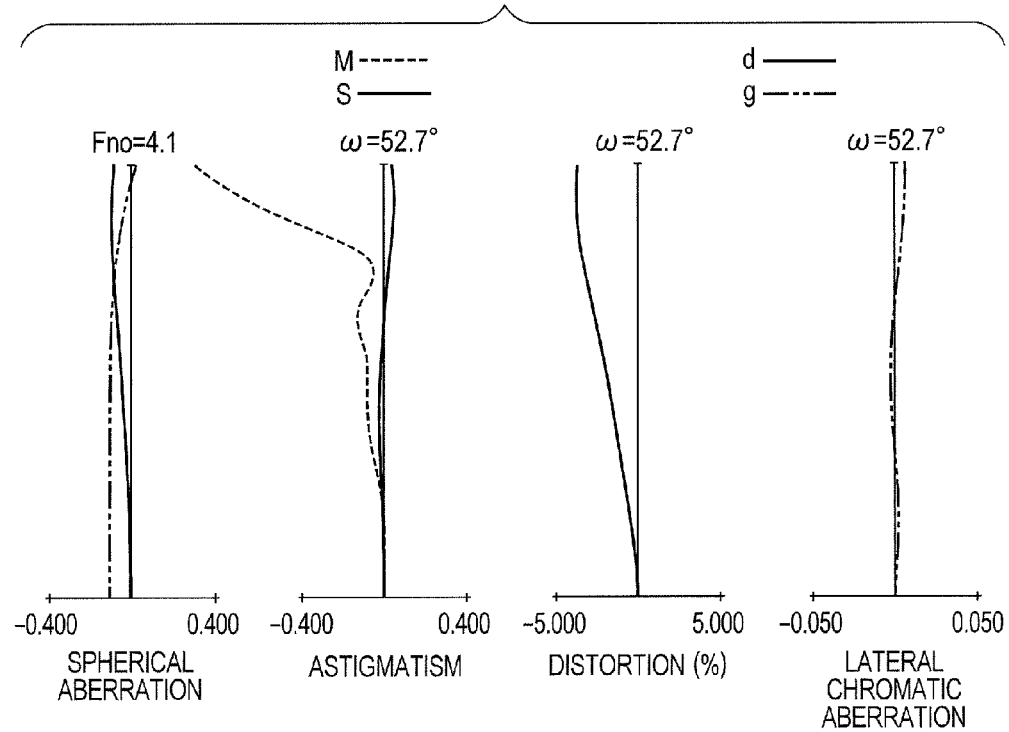
FIGS. 5A and 5B are aberration diagrams (at object of infinity) at the wide angle end and the telephoto end, respectively, of a zoom lens according to Numerical Embodiment 2 of the present invention.
Figure 5B:
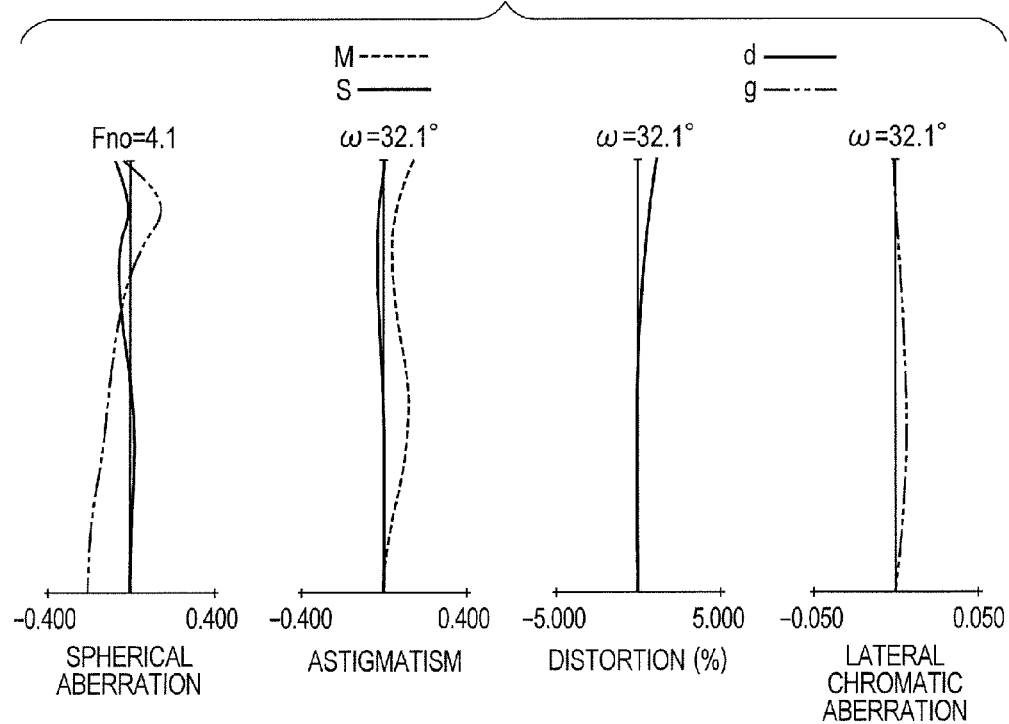
Figure 6A:
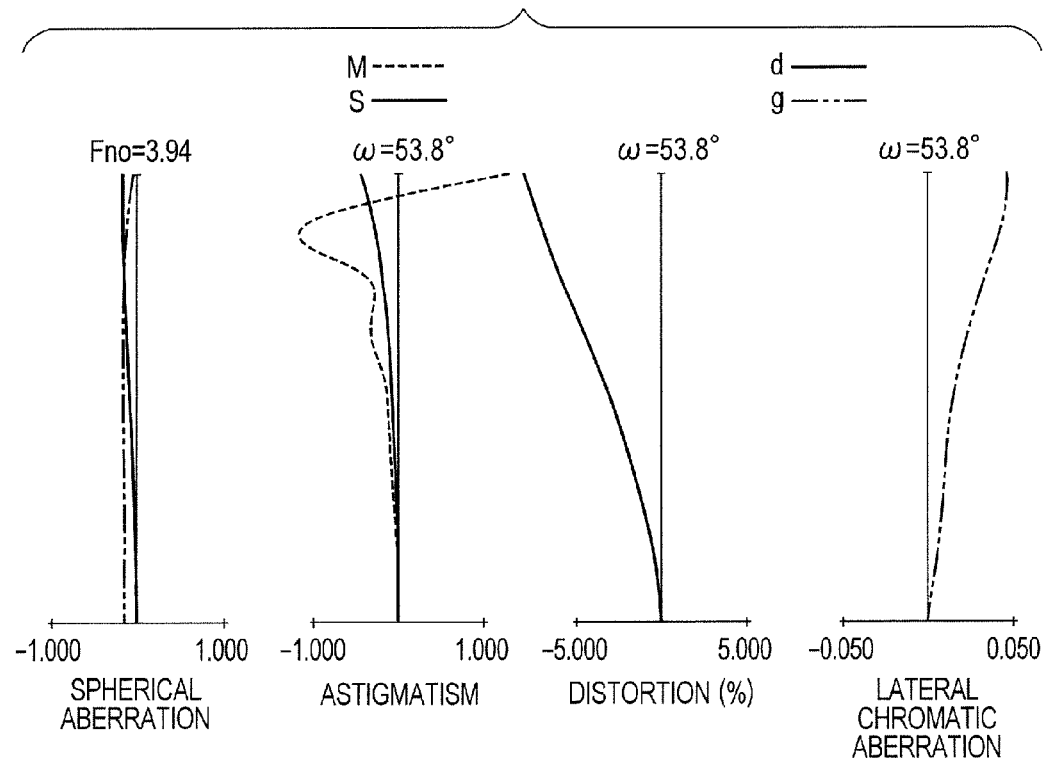
FIGS. 6A and 6B are aberration diagrams (at object distance: 0.28 m) at the wide angle end and the telephoto end, respectively, of the zoom lens according to Numerical Embodiment 2 of the present invention.
Figure 6B:
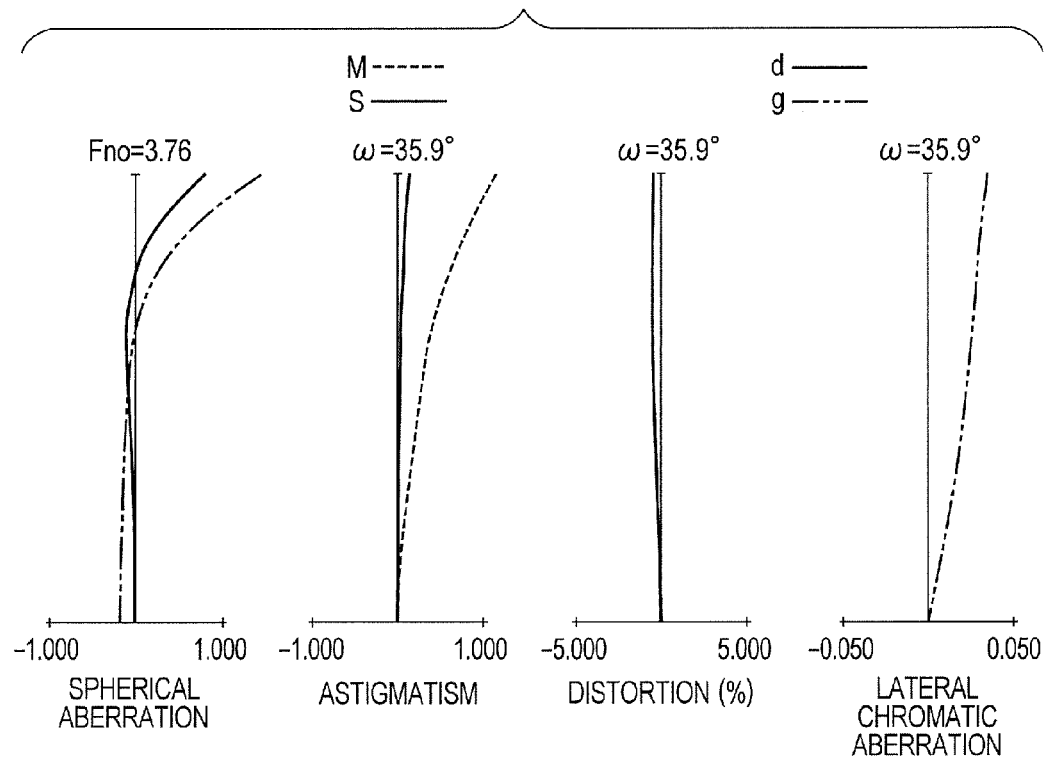

FIG. 4 is a lens cross-sectional view at the wide angle end and the telephoto end, respectively, according to Embodiment 2 of the present invention. FIGS. 5A and 5B are aberration diagrams at the wide angle end and the telephoto end, respectively, of a zoom lens according to Embodiment 2 of the present invention when the zoom lens is focused on the object of infinity. FIGS. 6A and 6B are aberration diagrams at the wide angle end and the telephoto end, respectively, of the zoom lens according to Embodiment 2 of the present invention at an object distance of 0.28 m when, in numerical embodiments which are described later, each size is expressed in units of mm.

Figure 7:
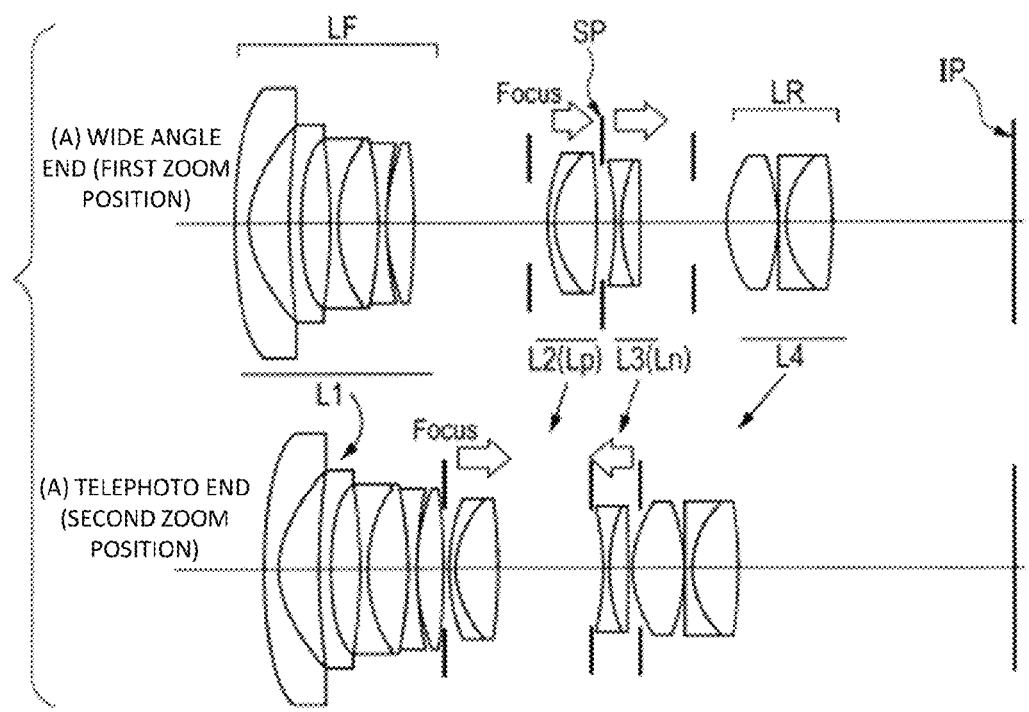
FIG. 7 is a lens cross-sectional view at a wide angle end and a telephoto end, respectively, of a zoom lens according to Embodiment 3 of the present invention.
Figure 8A:
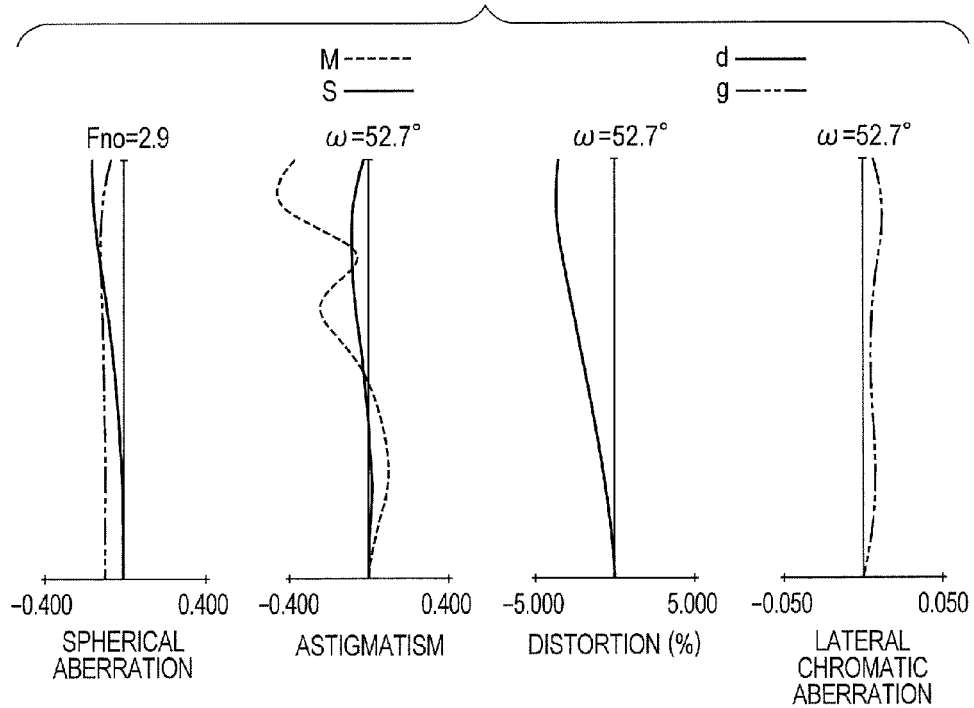
FIGS. 8A and 8B are aberration diagrams (at object of infinity) at the wide angle end and the telephoto end, respectively, of a zoom lens according to Numerical Embodiment 3 of the present invention.
Figure 8B:
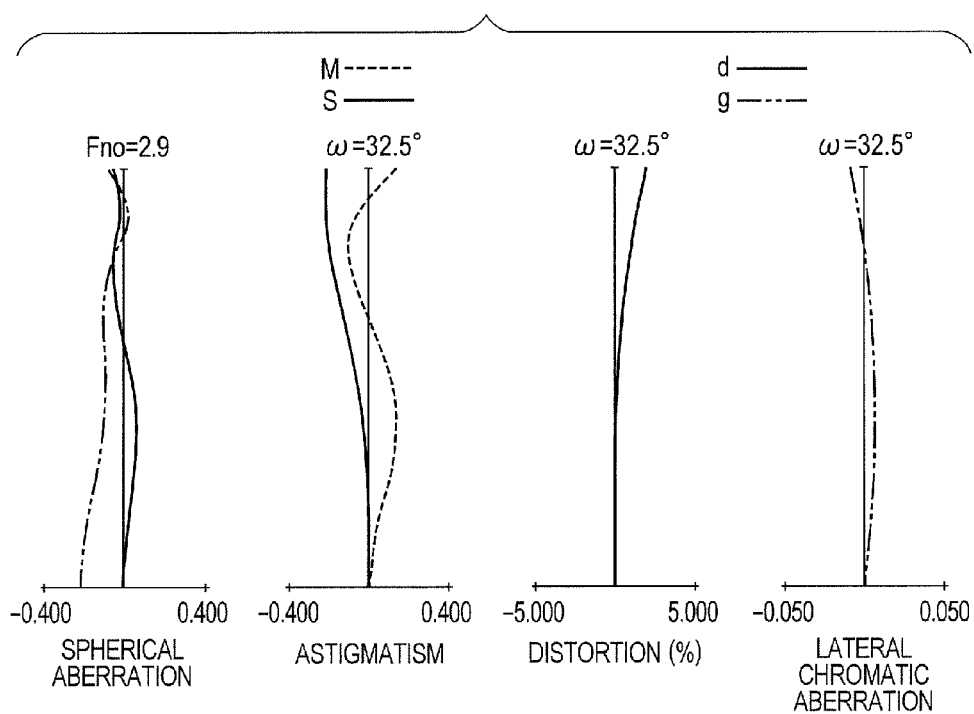
Figure 9A:
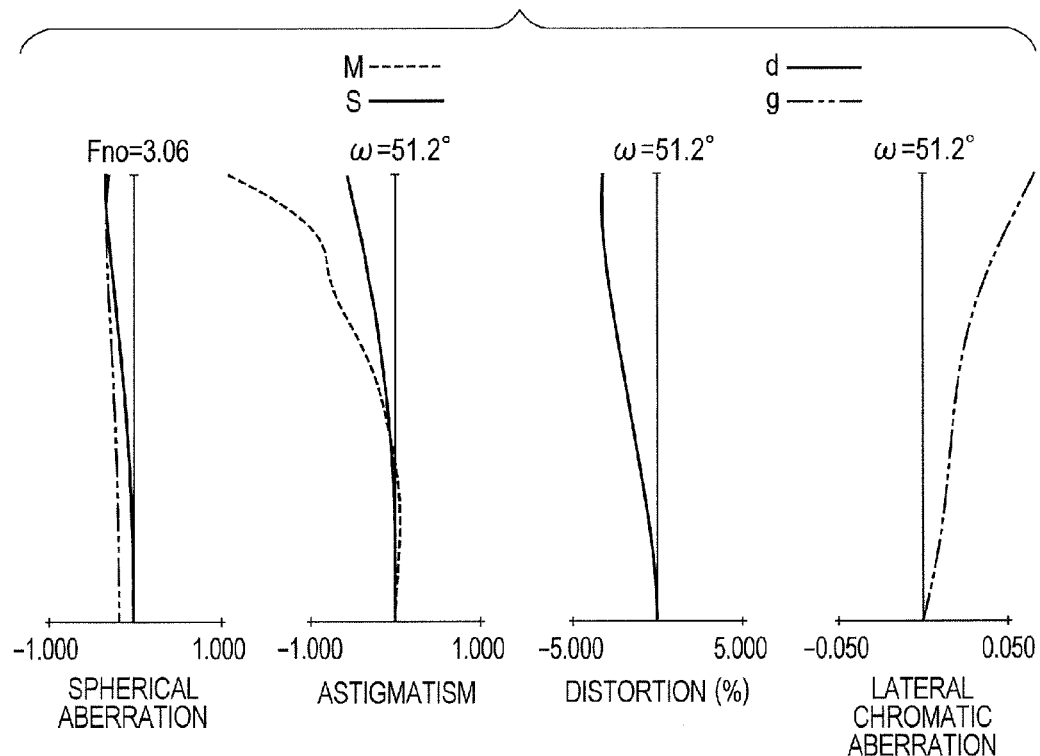
FIGS. 9A and 9B are aberration diagrams (at object distance: 0.28 m) at the wide angle end and the telephoto end, respectively, of the zoom lens according to Numerical Embodiment 3 of the present invention.
Figure 9B:
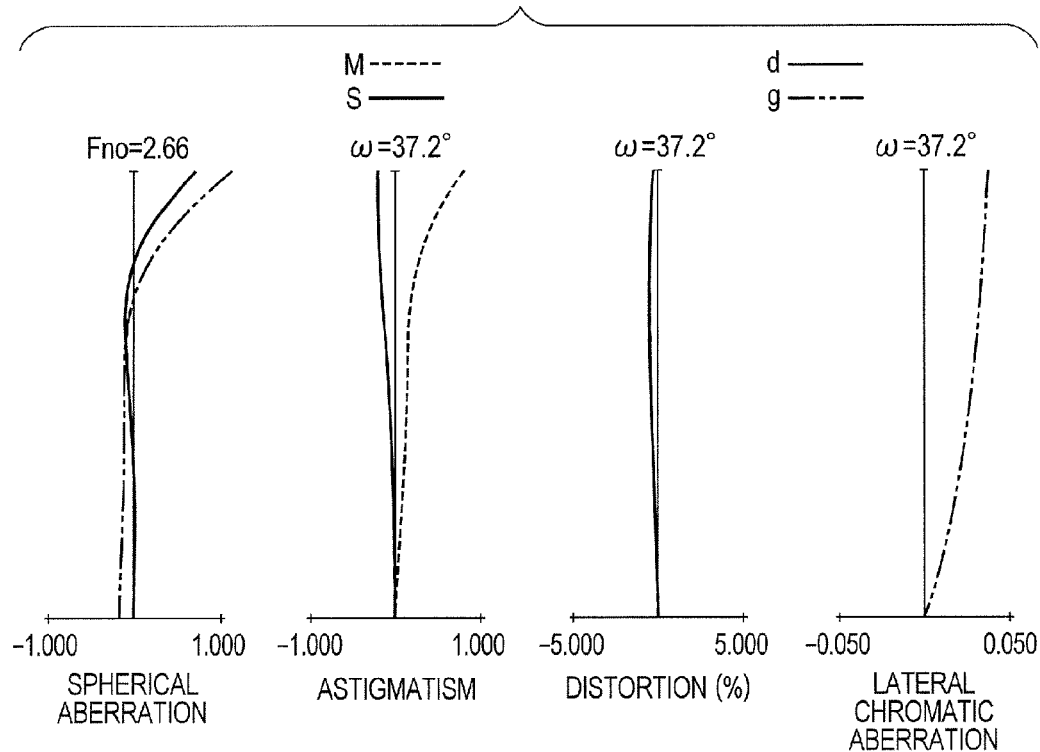

FIG. 7 is a lens cross-sectional view at the wide angle end and the telephoto end, respectively, according to Embodiment 3 of the present invention. FIGS. 8A and 8B are aberration diagrams at the wide angle end and the telephoto end, respectively, of a zoom lens according to Embodiment 3 of the present invention when the zoom lens is focused on the object of infinity. FIGS. 9A and 9B are aberration diagrams at the wide angle end and the telephoto end, respectively, of the zoom lens according to Embodiment 3 of the present invention at an object distance of 0.28 m when, in numerical embodiments which are described later, each size is expressed in units of mm.

Figure 10:
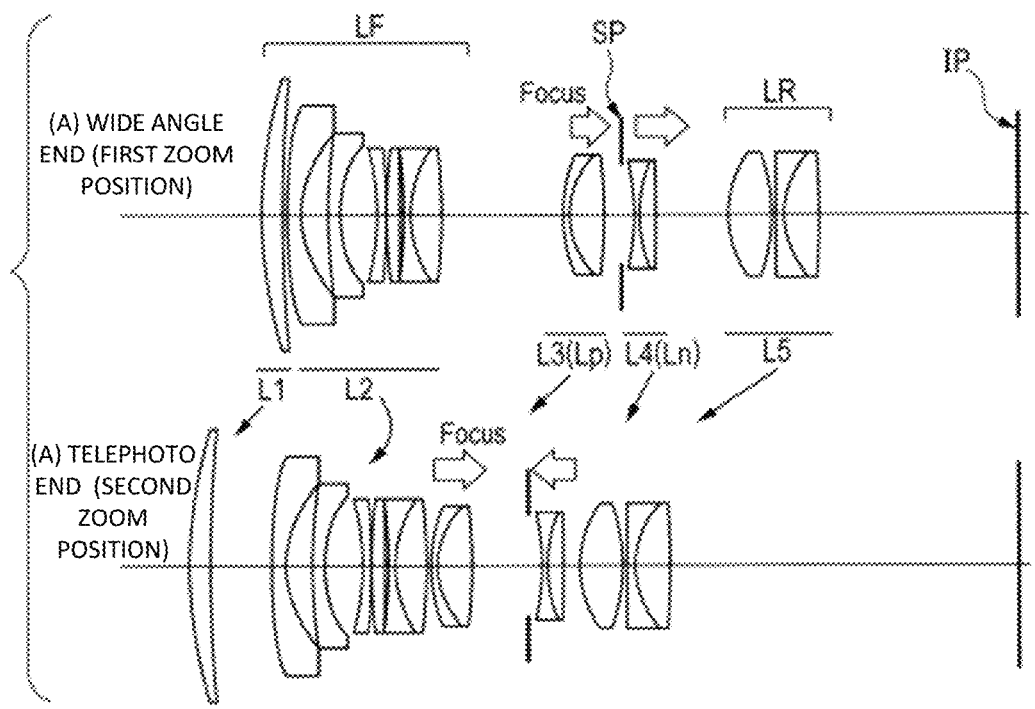
FIG. 10 is a lens cross-sectional view at a wide angle end and a telephoto end, respectively, of a zoom lens according to Embodiment 4 of the present invention.
Figure 11A:
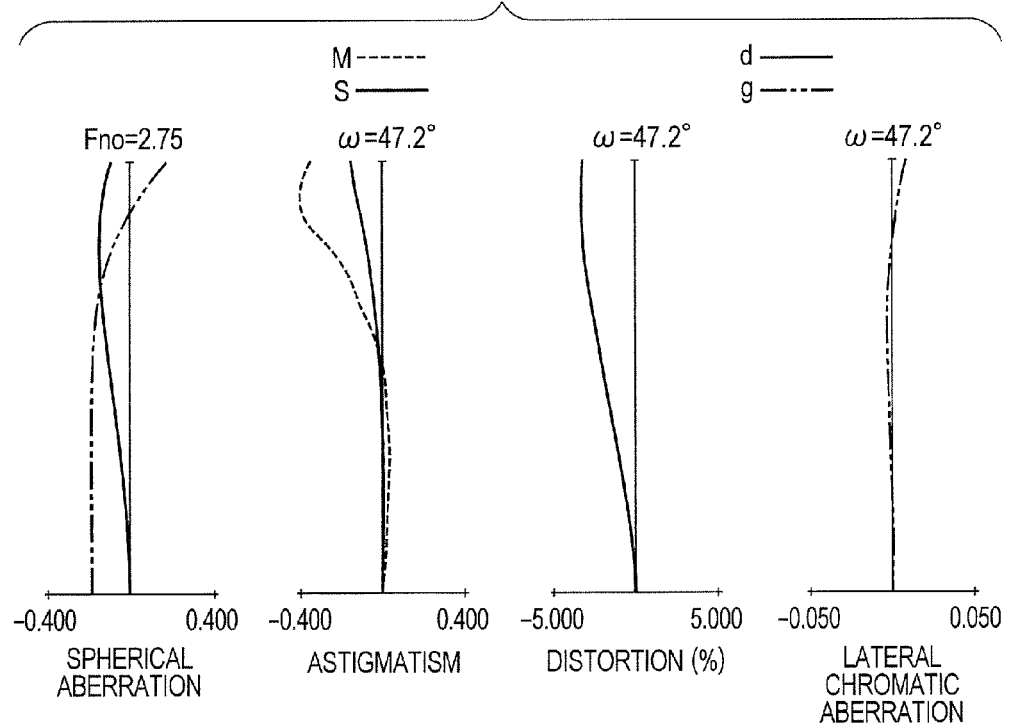
FIGS. 11A and 11B are aberration diagrams (at object of infinity) at the wide angle end and the telephoto end, respectively, of a zoom lens according to Numerical Embodiment 4 of the present invention.
Figure 11B:
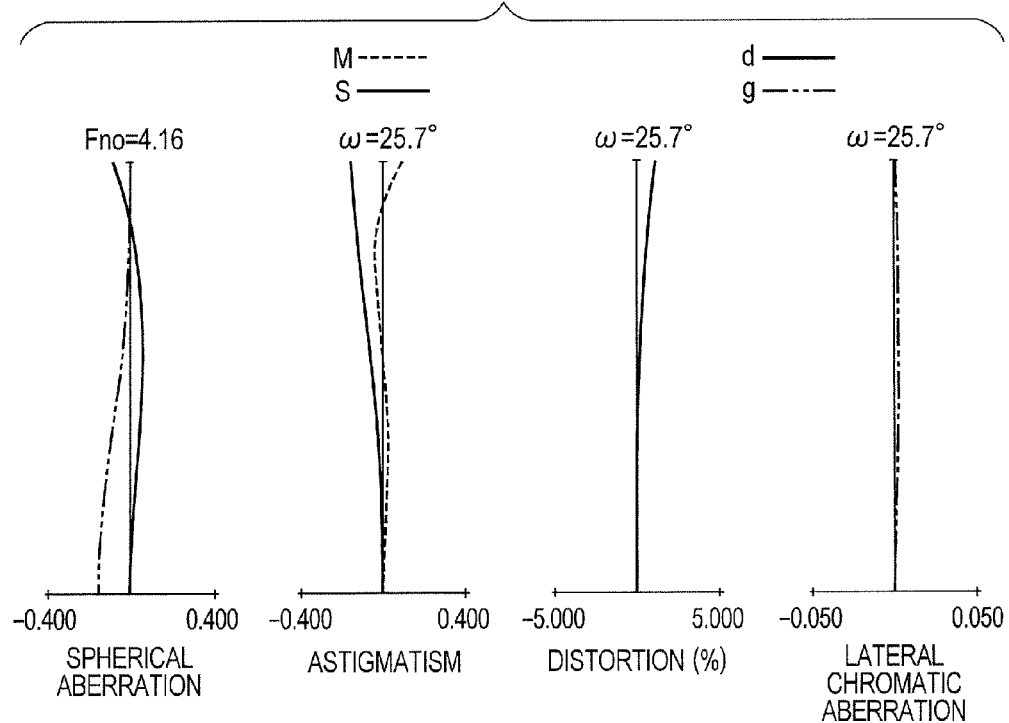
Figure 12A:
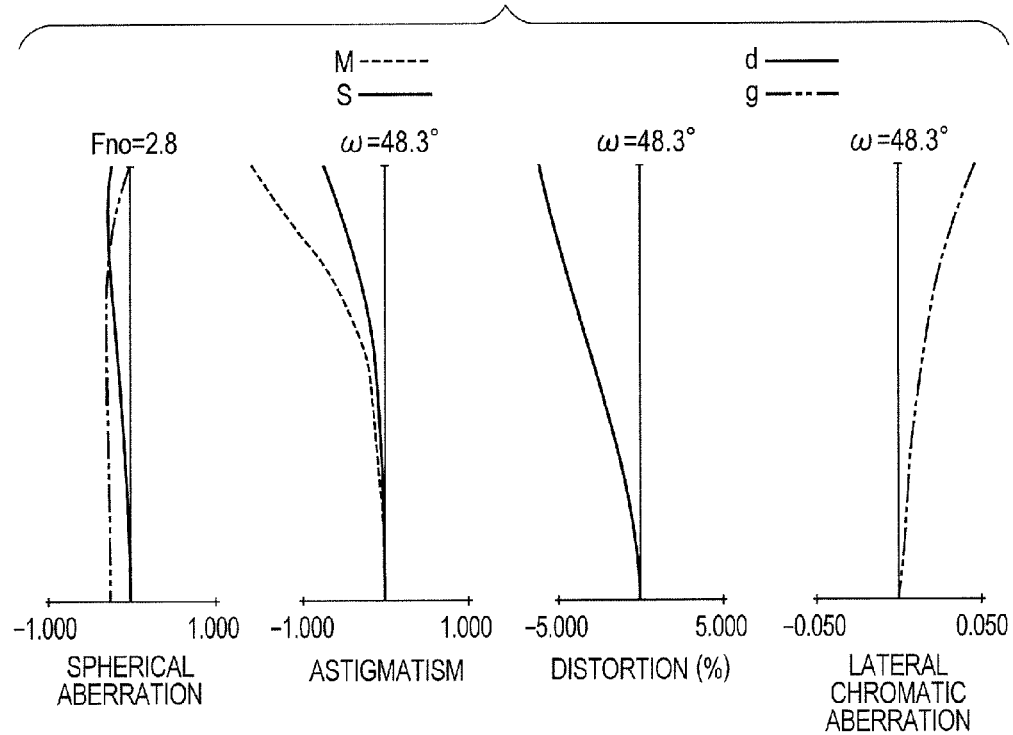
FIGS. 12A and 12B are aberration diagrams (at object distance: 0.28 m) at the wide angle end and the telephoto end, respectively, of the zoom lens according to Numerical Embodiment 4 of the present invention.
Figure 12B:
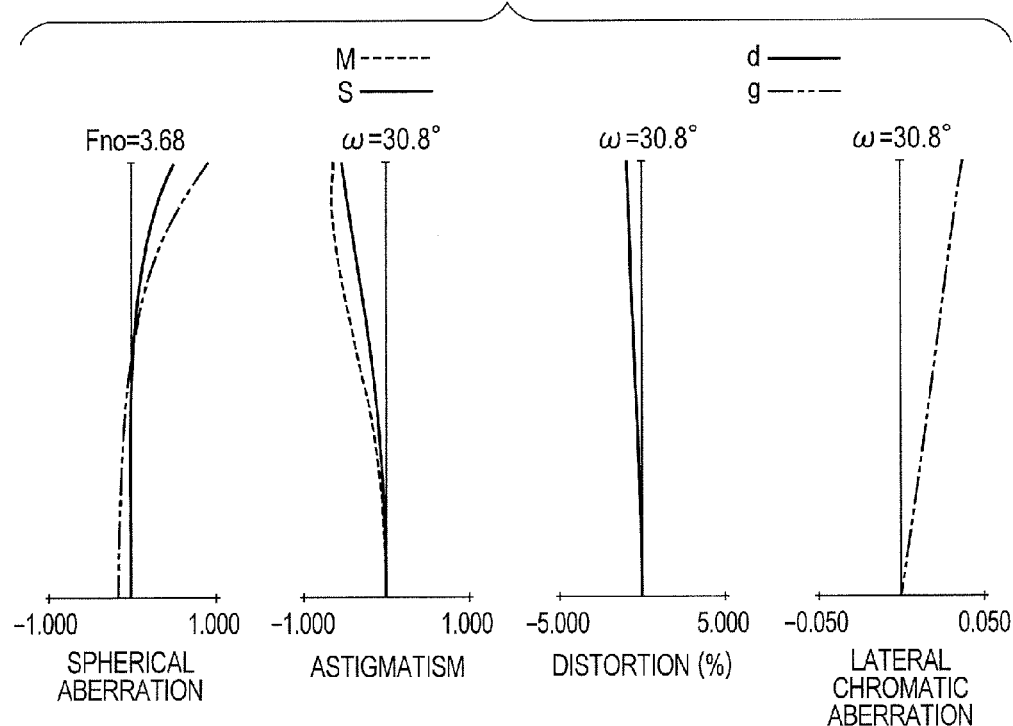

FIG. 10 is a lens cross-sectional view at the wide angle end and the telephoto end, respectively, according to Embodiment 4 of the present invention. FIGS. 11A and 11B are aberration diagrams at the wide angle end and the telephoto end, respectively, of a zoom lens according to Embodiment 4 of the present invention when the zoom lens is focused on the object of infinity. FIGS. 12A and 12B are aberration diagrams at the wide angle end and the telephoto end, respectively, of the zoom lens according to Embodiment 4 of the present invention at an object distance of 0.28 m when, in numerical embodiments which are described later, each size is expressed in units of mm.

The zoom lens of each of the embodiments is an image pickup optical system used for an image pickup apparatus such as a video camera, a digital still camera, or a silver halide film camera. On each of the lens cross-sectional views, the left is an object side (front side), whereas the right is an image side (rear side). In the lens cross-sectional views, symbol i represents the order of the lens units from the object side, and symbol Li represents an i-th lens unit. The zoom lens includes a front lens group LF including at least one lens unit and a rear lens group LR including at least one lens unit.

The zoom lens includes an aperture stop SP. An image plane IP corresponds to an image plane of a solid-state image pickup element (photo-electric conversion element) such as a CCD sensor or a CMOS sensor when the zoom lens is used as an image pickup optical system of a video camera or a digital still camera, and corresponds to a film plane when the zoom lens is used as an image pickup optical system of a silver halide film camera. The arrow indicates a movement locus of each of the lens units during zooming from the wide angle end to the telephoto end. Further, the arrows concerning focus indicate movement directions of each of the lens units in focusing from an object at infinity to an object at short distance.

Among the aberration diagrams, in the spherical aberration diagram, the solid line and the chain double-dashed line indicate a d-line (having a wavelength of 587.6 nm) and a g-line (having a wavelength of 435.8 nm), respectively. In the astigmatism diagram, the broken line and the solid line indicate a meridional image plane and a sagittal image plane on the d-line, respectively. Further, in the diagrams illustrating distortion, the distortion is indicated by the d-line. A lateral chromatic aberration is indicated by the g-line. Symbol FNo represents an F-number, and symbol ω represents a half angle of field (degree). Note that, in embodiments described below, the wide angle end and the telephoto end respectively refer to zoom positions when a magnification-varying lens unit is located at both ends of a mechanically movable range on an optical axis.

Features of the zoom lens according to the present invention are described below taking a negative lead type zoom lens as an embodiment. In a case where focusing is carried out with a first lens unit in the negative lead type zoom lens in which a lens unit having a negative refractive power precedes, an incidence height of a ray does not change from the image side to a second lens unit. Therefore, only a lens structure of the first lens unit may be optimized to make a variation in optical performance depending on the object distance relatively small.

However, an incidence height of an off-axial principal ray becomes the largest at the wide angle end, and hence the first lens unit has the largest effective diameter and is also heavy in the zoom lens. Therefore, it is difficult to carry out focusing at high speed. On the other hand, in a method in which focusing is carried out with all or a part of the second lens unit, an incidence height of an axial ray on the second lens unit becomes high.

In particular, the incidence height of the axial ray becomes high at the telephoto end. Therefore, aberrations caused by the second lens unit change vary significantly during zooming and focusing. In particular, a variation in spherical aberration becomes very large, and it becomes difficult to obtain high optical performance over an entire zoom range and an entire object distance. In addition, in the negative lead type zoom lens, a position of an exit pupil becomes closer to the image side as the zoom lens is downsized, and hence when focusing is carried out with a lens unit on the image side, the incidence height of the off-axial principal ray is significantly changed due to the focusing, and an image plane variation becomes very large.

On the other hand, when a plurality of lens units is moved during focusing, it becomes easy to reduce an aberration variation during the focusing.

The same applies to a positive lead type lens having a wide angle of field in which a positive lens unit is arranged closest to the object side.

In the present invention, in the zoom lens having the wide angle of field, two lens units are moved differently at a wide angle side and the telephoto side to obtain good optical performance over the entire zoom range and the entire object distance. More specifically, during focusing from the object at infinity to the object at short distance, the lens unit Lp having the positive refractive power is first driven toward the image side at the wide angle side and the telephoto side to obtain a focusing effect.

At this time, the incidence height of the axial ray becomes large and the variation in spherical aberration becomes large at the telephoto side, but in order to correct the variation, the lens unit Ln having the negative refractive power, which is arranged on the image side of the lens unit Lp, is moved toward the object side at the telephoto side to correct the variation in spherical aberration.

On the other hand, the incidence height of the axial ray becomes higher and a high focus sensitivity becomes easier to obtain at the wide angle side with the lens unit Ln than with the lens unit Lp. Therefore, the lens unit Ln is moved toward the image side to obtain a focusing effect at the wide angle side.

In addition, a variation in field curvature caused by the movement of the lens unit Lp toward the image side is also corrected by moving the lens unit Ln toward the image side.

In that manner, loads of the variations in optical performance due to focusing may be significantly reduced at both the wide angle side and the telephoto side, which reduces the numbers of lenses forming the lens unit Lp and the lens unit Ln. This may also increase movement amounts during zooming of the lens units, and reduce the aberration variation during the zooming.

In this manner, with the zoom lens according to the present invention, the zoom lens having the wide angle of field, which is small in size and has high performance, is obtained.

Next, exemplary configurations in embodying the zoom lens according to the present invention are described. The zoom lens according to the present invention includes a lens unit Lp having a positive refractive power and a lens unit Ln having a negative refractive power on the image side of the lens unit Lp. The zoom lens also includes a front lens group LF including at least one lens unit on the object side of the lens unit Lp. A combined focal length of the front lens group LF is negative at the wide angle end. The lens unit Lp moves toward the object side during zooming from the wide angle end to the telephoto end.

The lens unit Ln moves toward the image side during focusing from the object at infinity to the object at short distance at a first zoom position. During focusing from the object at infinity to the object at short distance at a second zoom position on the telephoto side of the first zoom position, the lens unit Lp moves toward the image side, and the lens unit Ln moves toward the object side. For embodiment, movement directions during focusing of the lens unit Lp and the lens unit Ln are as follows.

During focusing from a long distance to a short distance at the first zoom position, which is one zoom position in a first zoom area defined by an expression (a1) below, the lens unit Ln moves toward the image side. The lens unit Lp may or may not move at the first zoom position. In addition, during focusing from the long distance to the short distance at the second zoom position, which is one zoom position in a second zoom area defined by an expression (a2) below, the lens unit Lp moves toward the image side, and the lens unit Ln moves toward the object side. In other words, the lens unit Lp and the lens unit Ln move in opposite directions.

Note that, when a focal length of the zoom lens at the wide angle end is represented by fw, and a focal length of the zoom lens at the telephoto end is represented by ft, the first zoom area and the second zoom area are zoom areas defined by the following expressions (a1) and (a2).

$$\text{First zoom area: } f \leq 0.8 \times fw + 0.2 \times ft \quad (a1)$$

$$\text{Second zoom area: } f > 0.2 \times fw + 0.8 \times ft \quad (a2)$$

In the first zoom area, focusing is mainly carried out with the lens unit Ln. In a third zoom area between the first zoom area and the second zoom area, the movements and the movement directions during focusing of the lens unit Lp and the lens unit Ln are arbitrarily set in design.

When the lens unit Lp and the lens unit Ln are moved in the same direction, the variation in field curvature occurring in the lens unit Ln becomes easy to correct. The focus sensitivity of the lens unit Ln is subtracted, but a movement amount during focusing at the wide angle side is originally sufficiently small as compared to a movement amount at the telephoto side. Therefore, even when the movement amount is increased to some extent, for embodiment, there is no effect on a focusing speed in autofocus. Note, however, that for the object of infinity, there is a need to secure a space for the lens unit Lp to move toward the image side, and hence the movement of the lens unit Lp during the zooming from the wide angle end to the telephoto end is limited.

Therefore, in the first zoom area, whether the lens unit Lp is not moved or is driven toward the image side during focusing may be determined depending on which zoom position is given the importance in terms of performance. Note that, in the embodiments of the present invention, in order to reduce the image plane variation during focusing, the lens unit Lp is moved toward the image side. In addition, in the second zoom area, the lens unit Lp is moved toward the image side and the lens unit Ln is moved toward the object side to correct the variation in spherical aberration due to the focusing.

In addition, at all focal lengths (all zoom positions) in the first zoom area of the expression (a1), it is more preferred that, during focusing from the object at infinity to the object at short distance, the lens unit Ln move toward the image side and the lens unit Lp move toward the image side or do not move. In addition, at all focal lengths in the second zoom area of the expression (a2), it is more preferred that, during the focusing from the object at infinity to the object at short distance, the lens unit Lp move toward the image side and the lens unit Ln move toward the object side.

Next, a more preferred configuration in configuring the zoom lens according to the present invention is described. A focal length of the lens unit Lp is represented by fLp, and a focal length of the lens unit Ln is represented by fLn. A lateral magnification of the lens unit Lp at the wide angle end is represented by βpw, and a lateral magnification of the lens unit Ln at the wide angle end is represented by βnw. A lateral magnification of the lens unit Lp at the telephoto end is represented by βpt, and a lateral magnification of the lens unit Ln at the telephoto end is represented by βnt.

A movement amount during focusing of the lens unit Lp at the first zoom position is represented by DLpw, and a movement amount during focusing of the lens unit Ln at the first zoom position is represented by DLnw. Note, however, that the sign of the movement amount from the object side to the image side during focusing from the object at infinity to the object at short distance is positive. The same applies hereinafter. A movement amount during focusing of the lens unit Lp at the second zoom position is represented by DLpt, and a movement amount during focusing of the lens unit Ln at the second zoom position is represented by DLnt.

The zoom lens includes a rear lens group including at least one lens unit on the image side of the lens unit Ln. A combined focal length of the front lens group at the wide angle end is represented by fFw, a combined focal length of the rear lens group at the wide angle end is represented by fRw, and a focal length of the zoom lens at the wide angle end is represented by fw. At this time, it is preferred to satisfy at least one of the following conditional expressions.

$$0.3 < -fLp/fLn < 0.8 \quad (1)$$

$$-3.0 < \beta pw < -0.5 \quad (2)$$

$$|\beta nw| > 3.0 \quad (3)$$

$$|\beta pt| > 2.0 \quad (4)$$

$$-3.0 < \beta nt < -0.2 \quad (5)$$

$$0.0 \leq DLpw/DLnw < 1.2 \quad (6)$$

$$0.1 < -DLnt/DLpt < 1.0 \quad (7)$$

$$1.50 < fLp/fw < 4.00 \quad (8)$$

$$2.50 < -fLn/fw < 10.00 \quad (9)$$

$$0.70 < -fFw/fw < 2.50 \quad (10)$$

$$1.50 < fRw/fw < 5.00 \quad (11)$$

Next, the technical meanings of the above-mentioned conditional expressions are described. The conditional expression (1) is set in order to appropriately set a refractive power ratio of the lens unit Lp and the lens unit Ln, downsize the zoom lens, and make the aberration variation small during zooming and focusing. When a refractive power of the lens unit Lp becomes too weak and exceeds an upper limit value of the conditional expression (1), the zoom lens is increased in size, which is not preferred. When the refractive power of the lens unit Lp becomes too strong and falls below a lower limit value of the conditional expression (1), the variation in spherical aberration during the zooming and focusing becomes large, which is not preferred. It is more preferred to set the numerical value ranges of the conditional expression (1) as follows.

$$0.4 < -fLp/fLn < 0.7 \quad (1a)$$

The conditional expressions (2) and (3) are set so that the lens unit Ln has a larger focus sensitivity than that of the lens unit Lp and that a sufficient focusing effect may be obtained even when the lens unit Lp is moved in the same direction as the lens unit Ln for compensating for the aberrations at the wide angle end. Even when any one of the conditional expressions (2) and (3) exceeds or falls below an upper limit value or a lower limit value, the focusing effect of the lens unit Ln is cancelled by the lens unit Lp to increase a driving amount during focusing, which is not preferred. It is more preferred to set the numerical value ranges of the conditional expressions (2) and (3) as follows.

$$-2.0 < \beta pw < -0.8 \quad (2a)$$

$$|\beta nw| > 5.0 \quad (3a)$$

The conditional expression (4) is set so as to obtain a certain focus sensitivity of the lens unit Lp at the telephoto end. When the value of |βpt| falls below a lower limit value of the conditional expression (4), the variation in spherical aberration during focusing becomes small, but the focus sensitivity becomes small to increase the driving amount during focusing, with the result that the zoom lens is increased in size.

The conditional expression (5) is set so as to set the focus sensitivity of the lens unit Ln appropriately and correct the variation in spherical aberration caused by the lens unit Lp. When the value of βnt exceeds or falls below an upper limit value or a lower limit value of the conditional expression (5), the focus sensitivity of the lens unit Ln becomes too large to reduce a flexibility in driving, with the result that the function as the lens unit for compensating for the image plane variation, which varies during zooming, is reduced, which is not preferred. It is more preferred to set the numerical value ranges of the conditional expressions (4) and (5) as follows.

$$|\beta pt| > 3.0 \quad (4a)$$

$$-2.0 < \beta nt < -0.3 \quad (5a)$$

The conditional expression (6) is set so as to obtain a sufficient combined focus sensitivity of the lens unit Ln and the lens unit Lp and reduce the variation in field curvature during focusing. When the value of DLpw/DLnw exceeds an upper limit value of the conditional expression (6), the combined focus sensitivity of the lens unit Ln and the lens unit Lp becomes low, thereby increasing the driving amount during focusing, with the result that the zoom lens is increased in size. When the value of DLpw/DLnw falls below a lower limit value of the conditional expression (6), the variation in field curvature caused by the lens unit Ln becomes difficult to compensate for by the lens unit Lp. It is more preferred to set the numerical value range of the conditional expression (6) as follows.

$$0.1 \le DLpw/DLnw < 0.9 \quad (6a)$$

The conditional expression (7) defines a relationship of driving for focusing during focusing of the lens unit Lp and the lens unit Ln at the second zoom position. The conditional expression (7) is set so as to obtain sufficient focus sensitivities of the lens unit Ln and the lens unit Lp and reduce the variation in spherical aberration due to the focusing. When the value of $-DLnt/DLpt$ exceeds an upper limit value of the conditional expression (7), the driving amount of the lens unit Ln which has a lower focus sensitivity than the lens unit Lp, becomes too large, thereby increasing the driving amount during the focusing, with the result that the zoom lens is increased in size.

When the value of $-DLnt/DLpt$ falls below a lower limit value of the conditional expression (7), the variation in field curvature caused by the lens unit Lp becomes difficult to compensate for by the lens unit Ln. It is more preferred to set the numerical value range of the conditional expression (7) as follows.

$$0.2 < -DLnt/DLpt < 0.8 \quad (7a)$$

Each of the conditional expressions (8) to (11) is set so as to reduce the aberration variation during zooming and to downsize the zoom lens. When the values of fLp/fw, $-$fLn/fw, $-$fFw/fw, and fRw/fw exceed upper limit values of the conditional expressions (8) to (11), respectively, the zoom lens is increased in size. On the other hand, when the values of fLp/fw, $-$fLn/fw, $-$fFw/fw, and fRw/fw fall below lower limit values of the conditional expressions (8) to (11), respectively, refractive powers of the lens units become too strong, with the result that the aberration variation during the zooming becomes large. It is more preferred to set the numerical value ranges of the conditional expressions (8) to (11) as follows.

$$1.80 < fLp/fw < 3.50 \quad (8a)$$

$$3.50 < -fLn/fw < 8.00 \quad (9a)$$

$$0.90 < -fFw/fw < 2.00 \quad (10a)$$

$$2.00 < fRw/fw < 4.00 \quad (11a)$$

In each embodiment, the following conditional expressions are satisfied:

$$fa1 \le 0.8 \times fw + 0.2 \times ft; \text{ and}$$

$$fa2 > 0.2 \times fw + 0.8 \times ft,$$

where fa1 represents a focal length of the zoom lens at the first zoom position, and fa2 represents a focal length of the zoom lens at the second zoom position.

Next, it is preferred that the zoom lens according to the present invention includes two lens units that are driven during focusing: the lens unit Lp and the lens unit Ln, which facilitates simplification of a driving mechanism. It is also preferred that the lens unit Ln consists of two or less lenses, which reduces the weight of the lens unit and facilitates high-speed focusing. In addition, it is more preferred that the lens unit Lp consist of two or less lenses, which reduces the weight of the lens unit and facilitates high-speed focusing. The combined focal length of the front lens group LF is negative over the entire zoom range. This facilitates widening the angle of field.

The zoom lens according to the present invention is of the following zoom type, for embodiment. The zoom lens includes, in order from the object side to the image side, a first lens unit L1 having a negative refractive power, a second lens unit L2 having a positive refractive power, a third lens unit L3 having a negative refractive power, and a fourth lens unit L4 having a positive refractive power, in which the second lens unit L2 is the lens unit Lp, and the third lens unit L3 is the lens unit Ln.

Alternatively, the zoom lens includes, in order from the object side to the image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. In the zoom lens, the third lens unit L3 is the lens unit Lp, and the fourth lens unit L4 is the lens unit Ln.

Hereinafter, a lens structure in each of the embodiments is described. Embodiment 1 relates to a four-unit zoom lens including, in order from the object side to the image side, a first lens unit L1 having a negative refractive power, a second lens unit L2 having a positive refractive power, a third lens unit L3 having a negative refractive power, and a fourth lens unit L4 having a positive refractive power. During zooming from the wide angle end to the telephoto end, the second lens unit L2, the third lens unit L3, and the fourth lens unit L4 move toward the object side, and the first lens unit L1 follows a U-shaped locus along which the first lens unit L1 moves closer to the image side in an intermediate zoom area than at the wide angle end or the telephoto end. In other words, the first lens unit L1 moves along a locus convex to the image side.

The second lens unit L2 corresponds to the lens unit Lp, and the third lens unit L3 corresponds to the lens unit Ln. During focusing from the object at infinity to the object at short distance, the lens unit Lp moves toward the image side in all of the first zoom area and the second zoom area. The lens unit Ln moves toward the image side in the entire first zoom area and toward the object side in the entire second zoom area. Of the entire zoom range, in the third zoom area other than the first zoom area and the second zoom area, the movements and the movement directions of the lens unit Lp and the lens unit Ln are arbitrary.

In that manner, the high optical performance is obtained over all zoom areas from the wide angle end to the telephoto end and the entire object distance from the object of infinity to an object distance of 0.28 m. A power ratio of the lens unit Lp and the lens unit Ln satisfies the conditional expression (1), with the result that the zoom lens is downsized, and the aberration variation is reduced both for zooming and focusing. In addition, lateral magnifications β of the lens unit Lp and the lens unit Ln at the wide angle end and the telephoto end satisfy the conditional expressions (2), (3), (4), and (5). This reduces the aberration variation over all zoom areas and the entire object distance, and reduces the driving amount during focusing, with the result that the downsizing of the zoom lens is achieved.

In addition, the movement amounts during focusing of the lens unit Lp and the lens unit Ln at the wide angle end satisfy the conditional expression (6) to reduce the variation in field curvature depending on the object distance at the wide angle end. In addition, the movement amounts during focusing of the lens unit Lp and the lens unit Ln at the telephoto end satisfy the conditional expression (7). This reduces the movement amounts during focusing of both the lens unit Lp and the lens unit Ln to not only facilitate high-speed driving in autofocus but also reduce the variation in spherical aberration depending on the object distance.

In addition, each of the lens unit Lp and the lens unit Ln consists of two lenses to reduce loads on actuators and facilitate silence and high-speed driving. In addition, the lens unit Lp, a lens unit (L1) (front lens group LF) positioned on the object side of the lens unit Lp, the lens unit Ln, and a lens unit (L4) (rear lens group LR) positioned on the image side of the lens unit Ln satisfy the conditional expressions (8), (9), (10), and (11), respectively. This reduces the aberration variation due to the zooming of the zoom lens and downsizes the zoom lens.

In Embodiments 2 and 3, the number of lens units, a zoom type such as movement conditions of the lens units accompanying zooming, operations of the lens units during focusing, and the like are the same as in Embodiment 1. Embodiment 4 relates to a five-unit zoom lens including, in order from the object side to the image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power.

During zooming from the wide angle end to the telephoto end, the first lens unit L1, and the third lens unit L3 to the fifth lens unit L5 move toward the object side, and the second lens unit L2 follows a U-shaped locus along which the second lens unit L2 moves closer to the image side in the intermediate zoom area than at the wide angle end or the telephoto end. The third lens unit L3 corresponds to the lens unit Lp, and the fourth lens unit L4 corresponds to the lens unit Ln.

The zoom lens according to the present invention may similarly be applied to the positive lead type of Embodiment 4 as well as the negative lead type of Embodiments 1 to 3. The effects of the lens unit Lp and the lens unit Ln in Embodiment 4 are similar to those of Embodiment 1.

The zoom lens according to exemplary embodiments of the present invention is described above, but it should be understood that the present invention is not limited to those embodiments and can be modified and changed variously within the scope of the gist thereof.

Next, an embodiment in which the zoom lens described in each of Embodiments 1 to 4 is applied to the image pickup apparatus is described with reference to FIG. 13. The image pickup apparatus according to the present invention includes an interchangeable lens apparatus including the zoom lens, and a camera main body which is detachably connected to the interchangeable lens apparatus via a camera mount unit and includes an image pickup element for receiving an optical image formed by the zoom lens to convert the optical image into an electric image signal.

Figure 13:
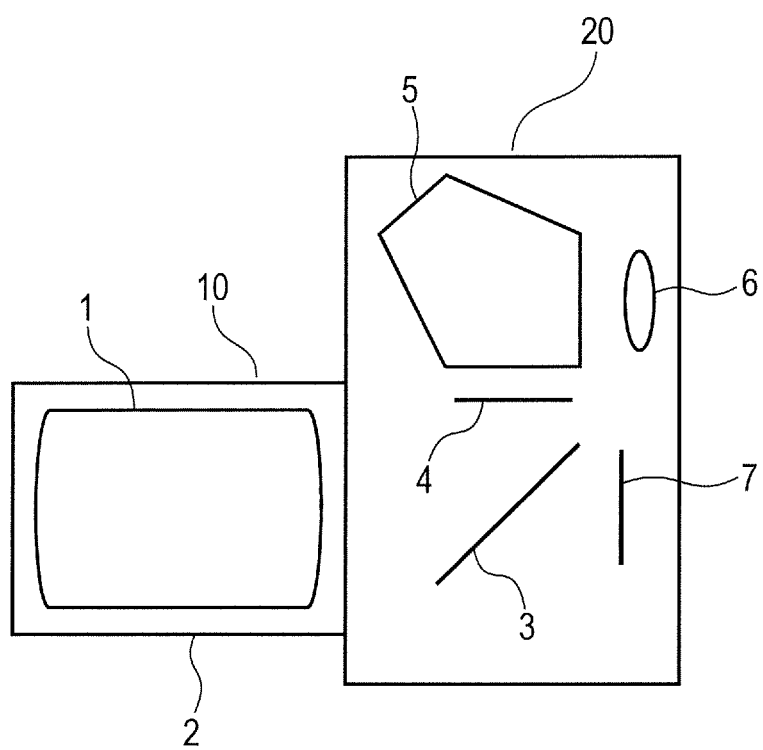
FIG. 13 is a schematic view illustrating a main part of an image pickup apparatus according to the present invention.

FIG. 13 is a schematic diagram of a main part of a single-lens reflex camera. In FIG. 13, an imaging lens 10 includes a zoom lens 1 of any one of Embodiments 1 to 4.

The zoom lens 1 is held by a lens barrel 2 as a holding member. A camera main body 20 includes a quick return mirror 3 for reflecting a light beam from the imaging lens 10 to the upward direction, and a reticle plate 4 arranged in an image forming position for the imaging lens 10. The camera main body 20 further includes a penta roof prism 5 for converting an inverse image formed on the reticle plate 4 into an erect image, and an eyepiece lens 6 for observing the erect image.

As a photosensitive plane 7, there is arranged a solid-state image pickup element (photo-electric conversion element) such as a CCD sensor or a CMOS sensor for receiving the image formed by the zoom lens, or a silver halide film. When taking an image, the quick return mirror 3 is retracted from the optical path, and an image is formed on the photosensitive plane 7 by the imaging lens 10. Benefits described in Embodiments 1 to 4 are effectively enjoyed by the image pickup apparatus disclosed in this embodiment. Further, the zoom lens of the present invention can also be similarly applied to a mirrorless camera which does not include a quick return mirror. The present invention may also be applied to an image projection optical system for a projector.

Numerical Embodiments 1 to 4 corresponding to Embodiments 1 to 4 are shown below. In each of Numerical Embodiments 1 to 4, symbol i represents the order from the object side. In each of Numerical Embodiments 1 to 4, symbol ri represents a radius of curvature of the i-th lens surface counted from the object side, symbol di represents a lens thickness or an air interval between the i-th surface and an (i+1)th surface counted from the object side, and symbols ndi and vdi represent a refractive index and an Abbe constant of a material between the i-th surface and the (i+1)th surface counted from the object side, respectively. Symbol BF represents the back focal length.

Moreover, in addition to such specifications as a focal length and an F-number, an image height represents a maximum image height used to determine a half angle of field, and a total lens length represents a distance from a first lens surface to the image plane. The back focal length BF represents a length from the final lens surface to the image plane. In addition, data on the lens units represents a focal length, a length on an optical axis (lens structure length), a front principal point position, and a rear principal point position of each of the lens units. In addition, the part where an interval d between optical surfaces is (variable) is changed during zooming, and the interval between surfaces corresponding to the focal length is shown in an annexed table. An aspherical shape is a shape that satisfies the following relationship:

$$Sag(R) = \frac{(1/R) \times R^2}{1 + \sqrt{1 - (1+K) \times (1/r)^2 \times R^2}} + A4 \times R^4 + A6 \times R^6 + A8 \times R^8 + A10 \times R^{10} + A12 \times R^{12} \qquad \text{Expression 1}$$

where Sag(R) is a surface position in an optical axis direction at a position moved away by R in a direction perpendicular to the optical axis, and aspherical coefficients of aspherical surfaces are shown in each table. In addition, the part where an effective diameter of each optical surface is (variable) is changed during zooming, and the effective diameter corresponding to the focal length is shown in an annexed table with a surface number eai. Note that, Table 1 shows results of calculations of the conditional expressions based on lens data in Numerical Embodiments 1 to 4 described below.

Numerical Embodiment 1

Unit: mm

Surface data

| Surface number | r | d | nd | vd | Effective diameter |
|---|---|---|---|---|---|
| 1* | ∞ | 2.80 | 1.77250 | 49.6 | 53.32 |
| 2* | 21.059 | 9.38 | | | 39.26 |
| 3* | 96.241 | 2.50 | 1.85135 | 40.1 | 38.70 |
| 4* | 52.918 | 5.38 | | | 32.56 |
| 5 | −79.038 | 1.65 | 1.77250 | 49.6 | 32.46 |
| 6 | 62.488 | 0.15 | | | 32.09 |
| 7 | 39.659 | 8.00 | 1.85478 | 24.8 | 32.56 |
| 8 | −53.120 | 1.60 | 1.80809 | 22.8 | 32.04 |
| 9 | 57.610 | 1.02 | | | 30.33 |
| 10 | 66.115 | 4.29 | 1.78472 | 25.7 | 30.28 |
| 11 | −190.786 | (Variable) | | | 29.81 |
| 12 | ∞ | (Variable) | | | (Variable) |
| 13 | 37.610 | 1.45 | 2.00100 | 29.1 | 28.07 |
| 14 | 19.696 | 8.96 | 1.77250 | 49.6 | 27.27 |
| 15 | −96.698 | (Variable) | | | 27.38 |
| 16 (stop) | ∞ | (Variable) | | | 25.05 |
| 17 | −57.672 | 1.20 | 1.83400 | 37.2 | 24.07 |
| 18 | 32.004 | 4.04 | 1.84666 | 23.8 | 24.63 |
| 19 | −1024.351 | (Variable) | | | 24.79 |
| 20 | ∞ | (Variable) | | | (Variable) |
| 21 | 23.655 | 8.54 | 1.43875 | 94.9 | 26.26 |
| 22 | −41.410 | 0.15 | | | 26.43 |
| 23* | 139.298 | 1.80 | 1.85400 | 40.4 | 25.93 |
| 24 | 19.116 | 9.25 | 1.49700 | 81.5 | 25.52 |
| 25 | −85.368 | | | | 26.80 |

Aspherical surface data

First surface

K = 0.00000e+000  A4 = 2.76615e−005  A6 = −5.96795e−008
A8 = 8.61814e−011  A10 = −7.14028e−014  A12 = 3.16309e−017

Second surface

K = −6.08504e−001  A4 = 9.34901e−006  A6 = 1.09006e−008
A8 = −7.02459e−011  A10 = −7.34466e−013  A12 = 1.50058e−015

Third surface

K = 0.00000e+000  A4 = −3.32091e−005  A6 = 5.92819e−008
A8 = −7.57591e−012  A10 = −3.00165e−014

Fourth surface

K = 1.09844e+000  A4 = −1.37506e−005  A6 = 5.53268e−008
A8 = 1.10142e−010  A10 = 2.17466e−013  A12 = −1.09413e−016

Twenty-third surface

K = 0.00000e+000  A4 = −1.20323e−005  A6 = −9.76527e−011
A8 = −1.38295e−010  A10 = 5.30718e−013  A12 = −1.00957e−015

Various data
Zoom ratio 2.06

| | Wide angle | Intermediate | Telephoto |
|---|---|---|---|
| Focal length | 16.48 | 23.60 | 33.95 |
| F-number | 2.90 | 2.90 | 2.90 |
| Half angle of field (degree) | 52.70 | 42.51 | 32.51 |
| Image height | 21.64 | 21.64 | 21.64 |
| Total lens length | 158.16 | 152.35 | 155.13 |
| BF | 38.00 | 45.31 | 58.31 |
| d11 | 15.84 | 9.07 | 1.00 |
| d12 | 10.74 | 2.33 | 0.00 |
| d15 | 4.00 | 12.42 | 14.74 |
| d16 | 2.50 | 2.87 | 7.92 |
| d19 | 8.42 | 8.05 | 3.00 |
| d20 | 6.50 | 0.15 | −2.00 |
| ea12 | 21.60 | 20.76 | 26.71 |
| ea20 | 17.30 | 20.10 | 25.33 |

Zoom lens unit data

| Unit | First surface | Focal length | Lens structure length | Front principal point position | Rear principal point position |
|---|---|---|---|---|---|
| 1 | 1 | −25.03 | 36.77 | 1.15 | −28.43 |
| 2 | 12 | ∞ | 0.00 | 0.00 | −0.00 |
| 3 | 13 | 44.53 | 10.41 | 1.70 | −4.29 |
| 4 | 16 | ∞ | 0.00 | 0.00 | −0.00 |
| 5 | 17 | −75.75 | 5.24 | −0.20 | −3.05 |
| 6 | 20 | ∞ | 0.00 | 0.00 | −0.00 |
| 7 | 21 | 45.85 | 19.74 | 2.19 | −11.68 |

Numerical Embodiment 2

Unit: mm

Surface data

| Surface number | r | d | nd | vd | Effective diameter |
|---|---|---|---|---|---|
| 1* | ∞ | 2.80 | 1.77250 | 49.6 | 50.16 |
| 2* | 25.165 | 8.10 | | | 39.15 |
| 3* | 54.316 | 2.50 | 1.85135 | 40.1 | 36.62 |
| 4* | 30.201 | 13.01 | | | 29.70 |
| 5 | −109.175 | 1.65 | 1.77250 | 49.6 | 23.46 |
| 6 | 29.164 | 0.52 | | | 22.21 |
| 7 | 28.996 | 6.11 | 1.85478 | 24.8 | 22.79 |
| 8 | −30.539 | 1.60 | 1.80809 | 22.8 | 22.79 |
| 9 | 189.958 | 0.55 | | | 23.25 |
| 10 | −336.413 | 1.94 | 1.78472 | 25.7 | 23.25 |
| 11 | −162.622 | (Variable) | | | 23.84 |
| 12 | ∞ | (Variable) | | | (Variable) |
| 13 | 29.625 | 1.45 | 2.00100 | 29.1 | 21.40 |
| 14 | 15.790 | 7.07 | 1.77250 | 49.6 | 20.82 |
| 15 | −83.679 | (Variable) | | | 20.89 |
| 16 (stop) | ∞ | (Variable) | | | 18.99 |
| 17 | −48.181 | 1.20 | 1.83400 | 37.2 | 18.36 |
| 18 | 34.198 | 2.95 | 1.84666 | 23.8 | 18.68 |
| 19 | −299.149 | (Variable) | | | 19.00 |
| 20 | ∞ | (Variable) | | | (Variable) |
| 21 | 21.548 | 7.68 | 1.43875 | 94.9 | 22.23 |
| 22 | −29.701 | 0.17 | | | 22.47 |
| 23* | 3219.871 | 1.80 | 1.85400 | 40.4 | 22.01 |
| 24 | 18.891 | 6.59 | 1.49700 | 81.5 | 22.10 |
| 25 | −154.636 | | | | 23.12 |

Aspherical surface data

First surface

K = 0.00000e+000  A4 = 3.62294e−005  A6 = −6.85134e−008
A8 = 8.57765e−011  A10 = −5.88630e−014  A12 = 2.49028e−017

Second surface

K = −3.57439e−001  A4 = 1.60329e−005  A6 = 3.48480e−008
A8 = −1.17970e−010  A10 = −7.46775e−013  A12 = 1.34123e−015

Third surface

K = 0.00000e+000  A4 = −3.69161e−005  A6 = 5.09934e−008
A8 = −2.38432e−011  A10 = 2.21018e−014

Fourth surface

K = 1.96159e+000  A4 = −2.30345e−005  A6 = −4.71465e−009
A8 = 1.65301e−010  A10 = 6.77252e−014  A12 = 5.77216e−016

-continued

Unit: mm

| | | | | | |
|---|---|---|---|---|---|
| 24 | 18.275 | 9.32 | 1.49700 | 81.5 | 25.36 |
| 25 | −106.518 | | | | 26.60 |

Aspherical surface data

First surface

K = 0.000000+000   A4 = 1.94672e−005   A6 = −3.46698e−008
A8 = 4.15678e−011  A10 = −2.73544e−014  A12 = 9.90183e−018

Second surface

K = −6.59006e−001  A4 = 4.00733e−007   A6 = 1.49583e−009
A8 = 6.24651e−011  A10 = −8.32596e−013  A12 = 1.27080e−015

Third surface

K = 0.00000e+000   A4 = −3.29448e−005  A6 = 3.03288e−008
A8 = 2.98388e−011  A10 = −2.72836e−014

Fourth surface

K = −3.90494e+000  A4 = −9.99213e−006  A6 = 3.65799e−008
A8 = −3.03851e−011 A10 = 6.88577e−013   A12 = −8.74357e−016

Twenty-third surface

K = 0.00000e+000   A4 = −1.24403e−005  A6 = 3.26448e−009
A8 = −2.41595e−010 A10 = 1.12183e−012   A12 = −2.26589e−015

Various data
Zoom ratio 2.06

| | Wide angle | Intermediate | Telephoto |
|---|---|---|---|
| Focal length | 16.48 | 23.60 | 33.95 |
| F-number | 2.90 | 2.90 | 2.90 |
| Half angle of field (degree) | 52.70 | 42.51 | 32.51 |
| Image height | 21.64 | 21.64 | 21.64 |
| Total lens length | 161.87 | 155.25 | 155.40 |
| BF | 38.00 | 44.41 | 57.43 |
| d11 | 24.21 | 9.57 | 0.00 |
| d12 | 4.00 | 3.00 | 1.00 |
| d15 | 1.50 | 12.96 | 19.95 |
| d19 | 11.14 | 8.28 | 2.50 |
| d20 | 7.00 | 1.00 | −1.50 |
| ea12 | 17.50 | 20.76 | 26.34 |
| ea20 | 17.95 | 20.45 | 25.76 |

Zoom lens unit data

| Unit | First surface | Focal length | Lens structure length | Front principal point position | Rear principal point position |
|---|---|---|---|---|---|
| 1 | 1 | −26.77 | 36.85 | 0.20 | −30.61 |
| 2 | 12 | ∞ | 0.00 | 0.00 | −0.00 |
| 3 | 13 | 48.87 | 9.96 | 1.40 | −4.28 |
| 4 | 16 | −88.19 | 7.66 | 2.25 | −3.06 |
| 5 | 20 | ∞ | 0.00 | 0.00 | −0.00 |
| 6 | 21 | 47.61 | 21.54 | 1.42 | −13.58 |

Numerical Embodiment 4

Unit: mm

Surface data

| Surface number | r | d | nd | vd | Effective diameter |
|---|---|---|---|---|---|
| 1 | 99.412 | 4.29 | 1.48749 | 70.2 | 55.68 |
| 2 | 306.022 | (Variable) | | | 53.52 |
| 3* | ∞ | 2.80 | 1.77250 | 49.6 | 45.14 |
| 4* | 22.030 | 5.74 | | | 33.92 |

-continued

Unit: mm

Twenty-third surface

K = 0.00000e+000   A4 = −2.08913e−005  A6 = −9.74997e−009
A8 = −4.25856e−010 A10 = 2.82264e−012   A12 = −7.93916e−015

Various data
Zoom ratio 2.09

| | Wide angle | Intermediate | Telephoto |
|---|---|---|---|
| Focal length | 16.48 | 23.60 | 34.51 |
| F-number | 4.10 | 4.10 | 4.10 |
| Half angle of field (degree) | 52.70 | 42.51 | 32.08 |
| Image height | 21.64 | 21.64 | 21.64 |
| Total lens length | 144.00 | 142.35 | 150.39 |
| BF | 38.00 | 47.76 | 63.65 |
| d11 | 11.76 | 5.90 | 1.00 |
| d12 | 7.94 | 2.63 | 0.00 |
| d15 | 4.00 | 9.30 | 11.94 |
| d16 | 2.50 | 2.50 | 5.11 |
| d19 | 5.61 | 5.61 | 3.00 |
| d20 | 6.50 | 0.96 | −2.00 |
| ea12 | 11.84 | 15.27 | 20.49 |
| ea20 | 14.41 | 17.37 | 22.66 |

Zoom lens unit data

| Unit | First surface | Focal length | Lens structure length | Front principal point position | Rear principal point position |
|---|---|---|---|---|---|
| 1 | 1 | −18.98 | 38.78 | 5.35 | −24.75 |
| 2 | 12 | ∞ | 0.00 | 0.00 | −0.00 |
| 3 | 13 | 35.77 | 8.52 | 1.20 | −3.68 |
| 4 | 16 | ∞ | 0.00 | 0.00 | −0.00 |
| 5 | 17 | −71.45 | 4.15 | −0.47 | −2.74 |
| 6 | 20 | ∞ | 0.00 | 0.00 | −0.00 |
| 7 | 21 | 49.66 | 16.23 | −0.25 | −11.16 |

Numerical Embodiment 3

Unit: mm

Surface data

| Surface number | r | d | nd | vd | Effective diameter |
|---|---|---|---|---|---|
| 1* | ∞ | 2.80 | 1.77250 | 49.6 | 55.30 |
| 2* | 21.077 | 8.19 | | | 41.18 |
| 3* | 51.680 | 2.50 | 1.85135 | 40.1 | 40.70 |
| 4* | 41.368 | 5.96 | | | 34.67 |
| 5 | −93.331 | 1.70 | 1.77250 | 49.6 | 34.55 |
| 6 | 32.677 | 8.29 | 1.69895 | 30.1 | 33.18 |
| 7 | −82.039 | 0.15 | | | 32.90 |
| 8 | −79.439 | 1.60 | 1.80809 | 22.8 | 32.85 |
| 9 | 69.257 | 0.15 | | | 32.36 |
| 10 | 50.910 | 5.51 | 1.85478 | 24.8 | 32.57 |
| 11 | −125.535 | (Variable) | | | 32.22 |
| 12 | ∞ | (Variable) | | | (Variable) |
| 13 | 39.614 | 1.50 | 2.00100 | 29.1 | 27.95 |
| 14 | 20.601 | 8.46 | 1.77250 | 49.6 | 27.26 |
| 15 | −115.972 | (Variable) | | | 27.35 |
| 16 (stop) | ∞ | 2.50 | | | 24.83 |
| 17 | −65.765 | 1.20 | 1.83400 | 37.2 | 24.67 |
| 18 | 34.565 | 3.96 | 1.84666 | 23.8 | 25.18 |
| 19 | −900.265 | (Variable) | | | 25.33 |
| 20 | ∞ | (Variable) | | | (Variable) |
| 21 | 22.662 | 10.27 | 1.43875 | 94.9 | 27.22 |
| 22 | −44.647 | 0.15 | | | 26.88 |
| 23* | 123.096 | 1.80 | 1.85400 | 40.4 | 26.04 |

-continued

Unit: mm

| | | | | | |
|---|---|---|---|---|---|
| 5* | 49.619 | 2.50 | 1.85135 | 40.1 | 33.42 |
| 6* | 27.377 | 7.93 | | | 28.19 |
| 7 | −48.894 | 1.65 | 1.83400 | 37.2 | 27.23 |
| 8 | −282.058 | 0.15 | | | 27.28 |
| 9 | 121.293 | 2.82 | 1.85478 | 24.8 | 27.24 |
| 10 | −360.481 | 0.50 | | | 27.06 |
| 11 | −164.204 | 1.60 | 1.49700 | 81.5 | 27.01 |
| 12 | 25.459 | 6.54 | 1.61340 | 44.3 | 26.34 |
| 13 | −108.288 | (Variable) | | | 25.94 |
| 14 | 36.284 | 1.45 | 2.00100 | 29.1 | 23.77 |
| 15 | 18.806 | 6.94 | 1.77250 | 49.6 | 22.72 |
| 16* | −102.681 | (Variable) | | | 22.62 |
| 17 (stop) | ∞ | (Variable) | | | 21.09 |
| 18 | −73.296 | 1.20 | 1.83400 | 37.2 | 21.14 |
| 19 | 31.835 | 3.31 | 1.84666 | 23.8 | 21.44 |
| 20 | 1421.200 | (Variable) | | | 21.59 |
| 21 | 22.919 | 8.93 | 1.43875 | 94.9 | 25.10 |
| 22 | −39.831 | 0.80 | | | 25.19 |
| 23* | 180.502 | 1.80 | 1.85400 | 40.4 | 24.43 |
| 24 | 19.161 | 7.08 | 1.49700 | 81.5 | 24.00 |
| 25 | −308.852 | | | | 24.82 |

Aspherical surface data

Third surface

K = 0.00000e+000  A4 = 2.65010e−005  A6 = −6.12679e−008
A8 = 9.25737e−011  A10 = −7.20070e−014  A12 = 2.32701e−017

Fourth surface

K = −6.07409e−001  A4 = 1.045480−005  A6 = 1.26526e−008
A8 = −1.46916e−010  A10 = −7.15214e−013  A12 = 1.62205e−015

Fifth surface

K = 0.00000e+000  A4 = −3.66238e−005  A6 = 5.69195e−008
A8 = −2.99343e−011  A10 = −6.07436e−015

Sixth surface

K = −3.59648e−001  A4 = −1.48481e−005  A6 = 5.32691e−008
A8 = 1.76146e−010  A10 = 3.32879e−013  A12 = 2.00467e−016

Sixteenth surface

K = 0.00000e+000  A4 = 3.85148e−007  A6 = −1.92465e−009
A8 = −2.80537e−012

Twenty-third surface

K = 0.00000e+000  A4 = −1.35230e−005  A6 = −1.80732e−008
A8 = −3.53819e−011

Various data
Zoom ratio 2.25

| | Wide angle | Intermediate | Telephoto |
|---|---|---|---|
| Focal length | 20.00 | 23.60 | 45.00 |
| F-number | 2.75 | 2.90 | 4.16 |
| Half angle of field (degree) | 47.25 | 42.51 | 25.68 |
| Image height | 21.64 | 21.64 | 21.64 |
| Total lens length | 158.28 | 156.32 | 173.36 |
| BF | 42.05 | 46.10 | 73.14 |
| d2 | 0.80 | 1.68 | 12.83 |
| d13 | 25.50 | 18.60 | 1.00 |
| d16 | 4.00 | 6.94 | 12.07 |
| d17 | 2.50 | 2.50 | 2.50 |
| d20 | 15.40 | 12.47 | 3.80 |

Zoom lens unit data

| Unit | First surface | Focal length | Lens structure length | Front principal point position | Rear principal point position |
|---|---|---|---|---|---|
| 1 | 1 | 300.01 | 4.29 | −1.38 | −4.24 |
| 2 | 3 | −22.96 | 32.23 | 1.32 | −26.17 |
| 3 | 14 | 44.26 | 8.39 | 1.17 | −3.60 |
| 4 | 17 | ∞ | 0.00 | 0.00 | −0.00 |
| 5 | 18 | −86.28 | 4.51 | 0.10 | −2.34 |
| 6 | 21 | 53.44 | 18.60 | −1.28 | −13.71 |

TABLE 1

| | | Numerical Embodiment | | | |
|---|---|---|---|---|---|
| | | 1 | 2 | 3 | 4 |
| Lens unit type | | Negative positive negative positive | Negative positive negative positive | Negative positive negative positive | Positive negative positive negative positive |
| Lp unit | | L2 | L2 | L2 | L3 |
| Ln unit | | L3 | L3 | L3 | L4 |
| | fw | 16.480 | 16.480 | 16.480 | 20.000 |
| | ft | 33.950 | 34.510 | 33.950 | 45.000 |
| | fLp | 44.530 | 35.770 | 48.870 | 44.260 |
| | fLn | −75.750 | −71.450 | −88.190 | −86.280 |
| | fFw | −25.030 | −18.980 | −26.770 | −25.441 |
| | fRw | 45.850 | 49.660 | 47.610 | 53.440 |
| | DLpw | 2.340 | 1.900 | 0.830 | 2.500 |
| | DLnw | 5.422 | 2.459 | 7.812 | 5.162 |
| | DLpt | 4.198 | 2.555 | 4.708 | 6.078 |
| | DLnt | −2.600 | −0.715 | −2.371 | −1.427 |
| (1) | −fLp/fLn | 0.588 | 0.501 | 0.554 | 0.513 |
| (2) | βpw | −1.197 | −1.240 | −1.282 | −1.322 |
| (3) | \|βnw\| | 6.593 | 69.321 | −5.772 | 13.682 |
| (4) | \|βpt\| | 3.830 | 3.524 | 4.476 | 4.884 |
| (5) | βnt | −0.673 | −1.019 | −0.577 | −0.554 |
| (6) | DLpw/DLnw | 0.432 | 0.773 | 0.106 | 0.484 |
| (7) | −DLnt/DLpt | 0.619 | 0.280 | 0.504 | 0.235 |
| (8) | fLp/fw | 2.702 | 2.171 | 2.965 | 2.213 |
| (9) | −fLn/−fw | 4.596 | 4.336 | 5.351 | 4.314 |
| (10) | −fFw/fw | 1.519 | 1.152 | 1.624 | 1.272 |
| (11) | fRw/fw | 2.782 | 3.013 | 2.889 | 2.672 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075362, filed Apr. 1, 2014, which is hereby incorporated by reference herein in its entirety.

What is claimed is:

1. A zoom lens, comprising, in order from an object side to an image side:
    a front lens group including at least one lens unit;
    a positive lens unit (Lp) having a positive refractive power; and
    a negative lens unit (Ln) having a negative refractive power,
    wherein an interval between the lens units adjacent to each other is changed during zooming,
    wherein a combined focal length of the front lens group is negative at a wide angle end,
    wherein the positive lens unit (Lp) moves toward the object side during zooming from the wide angle end to a telephoto end,
    wherein the negative lens unit (Ln) moves toward the image side during focusing from an object at infinity to an object at short distance at a first zoom position,
    wherein during focusing from an object at infinity to an object at short distance at a second zoom position which is on a telephoto side of the first zoom position, the positive lens unit (Lp) moves toward the image side, and the negative lens unit (Ln) moves toward the object side, and wherein the following conditional expressions are satisfied:

$$fa1 \leq 0.8 \times fw + 0.2 \times ft; \text{ and}$$

$$fa2 > 0.2 \times fw + 0.8 \times ft,$$

where fw represents a focal length of the zoom lens at the wide angle end, ft represents a focal length of the zoom lens at the telephoto end, fa1 represents a focal length of the zoom lens at the first zoom position, and fa2 represents a focal length of the zoom lens at the second zoom position.

2. A zoom lens according to claim 1, wherein the positive lens unit (Lp) moves toward the image side during the focusing from an object at infinity to an object at short distance at the first zoom position.

3. A zoom lens according to claim 1, wherein the following conditional expression is satisfied:

$$0.3 < -fLp/fLn < 0.8$$

where fLp represents a focal length of the positive lens unit (Lp) and fLn represents a focal length of the negative lens unit (Ln).

4. A zoom lens according to claim 1, wherein the following conditional expressions are satisfied:

$$-3.0 < \beta pw < -0.5; \text{ and}$$

$$|\beta nw| > 3.0,$$

where βpw represents a lateral magnification of the positive lens unit (Lp) at the wide angle end, and βnw represents a lateral magnification of the negative lens unit (Ln) at the wide angle end.

5. A zoom lens according to claim 1, wherein the following conditional expressions are satisfied:

$$|\beta pt| > 2.0; \text{ and}$$

$$-3.0 < \beta nt < -0.2,$$

where βpt represents a lateral magnification of the positive lens unit (Lp) at the telephoto end, and βnt represents a lateral magnification of the negative lens unit (Ln) at the telephoto end.

6. A zoom lens according to claim 1,
wherein the positive lens unit (Lp) moves toward the image side during the focusing from an object at infinity to an object at short distance at the first zoom position, and
wherein the following conditional expression is satisfied:

$$0.0 \leq DLpw/DLnw < 1.2,$$

where DLpw represents a movement amount of the positive lens unit (Lp) during the focusing from an object at infinity to an object at short distance at the first zoom position, DLnw represents a movement amount of the negative lens unit (Ln) during the focusing from an object at infinity to an object at short distance at the first zoom position, and signs of the movement amounts are positive when moving from the object side to the image side during focusing from an object at infinity to an object at short distance.

7. A zoom lens according to claim 1, wherein the following conditional expression is satisfied:

$$0.1 < -DLnt/DLpt < 1.0,$$

where DLpt represents a movement amount of the positive lens unit (Lp) during the focusing from an object at infinity to an object at short distance at the second zoom position, DLnt represents a movement amount of the negative lens unit (Ln) during the focusing from an object at infinity to an object at short distance at the second zoom position, and signs of the movement amounts are positive when moving from the object side to the image side during focusing from an object at infinity to an object at short distance.

8. A zoom lens according to claim 1, wherein the negative lens unit (Ln) consists of two or less lenses.

9. A zoom lens according to claim 1, wherein the positive lens unit (Lp) consists of two or less lenses.

10. A zoom lens according to claim 1,
wherein the zoom lens consists of, in order from the object side to the image side, a first lens unit having a negative refractive power, a second lens unit having a positive refractive power, a third lens unit having a negative refractive power, and a fourth lens unit having a positive refractive power,
wherein the second lens unit is the positive lens unit (Lp), and
wherein the third lens unit is the negative lens unit (Ln).

11. A zoom lens according to claim 1,
wherein the zoom lens consists of, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power,
wherein the third lens unit is the positive lens unit (Lp), and
wherein the fourth lens unit is the negative lens unit (Ln).

12. A zoom lens according to claim 1, further comprising a rear lens group including at least one lens unit on the image side of the negative lens unit (Ln),
wherein the following conditional expressions are satisfied:

$$1.50 < fLp/fw < 4.00;$$

$$2.50 < -fLn/fw < 10.00;$$

$$0.70 < -fFw/fw < 2.50; \text{ and}$$

$$1.50 < fRw/fw < 5.00,$$

where fLp represents a focal length of the positive lens unit (Lp), fLn represents a focal length of the negative lens unit (Ln), fFw represents the combined focal length of the front lens group at the wide angle end, fRw represents a combined focal length of the rear lens group at the wide angle end, and fw represents a focal length of the zoom lens at the wide angle end.

13. A zoom lens according to claim 1, wherein the combined focal length of the front lens group is negative over an entire zoom range.

14. An image pickup apparatus, comprising:
a zoom lens; and
an image sensor configured to receive an image formed by the zoom lens,
wherein the zoom lens comprises, in order from an object side to an image side:
a front lens group including at least one lens unit;
a positive lens unit (Lp) having a positive refractive power; and a negative lens unit (Ln) having a negative refractive power, wherein an interval between adjacent the lens units adjacent to each other is changed during zooming, wherein a combined focal length of the front lens group is negative at a wide angle end, wherein the positive lens unit (Lp) moves toward the object side during zooming from the wide angle end to a telephoto end, wherein the negative lens unit (Ln) moves toward the image side during focusing from an object at infinity to an object at short distance at a first zoom position, wherein during focusing from an object at infinity to an object at short distance at a second zoom position which is on a telephoto side of the first zoom position, the positive lens unit (Lp) moves toward the image side, and the negative lens unit (Ln) moves toward the object side, and wherein the following conditional expressions are satisfied:

$$fa1 \leq 0.8 \times fw + 0.2 \times ft, \text{ and}$$

$$fa2 > 0.2 \times fw + 0.8 \times ft,$$

where fw represents a focal length of the zoom lens at the wide angle end, ft represents a focal length of the zoom lens at the telephoto end, fa1 represents a focal length of the zoom lens at the first zoom position, and fa2 represents a focal length of the zoom lens at the second zoom position.

\* \* \* \* \*